United States Patent
Yuyama et al.

[19]

[11] Patent Number: 6,119,737
[45] Date of Patent: Sep. 19, 2000

[54] TABLET PACKING APPARATUS

[75] Inventors: Shoji Yuyama; Tsuyoshi Kodama; Shinichi Honda, all of Toyonaka; Hirotaka Hayashi, Amagasaki; Hirofumi Hayashi, Toyonaka; Kouichi Sugimoto, Toyonaka; Akitomi Kohama, Toyonaka, all of Japan

[73] Assignee: Yuyama Mfg. Co., Ltd., Toyonaka, Japan

[21] Appl. No.: 09/097,733

[22] Filed: Jun. 16, 1998

[30] Foreign Application Priority Data

Jun. 17, 1997 [JP] Japan ..................................... 9-159734
Apr. 28, 1998 [JP] Japan ..................................... 10-118619

[51] Int. Cl.$^7$ ........................................................ B65B 1/06
[52] U.S. Cl. ........................ 141/104; 141/83; 141/98; 141/106; 141/171; 141/174; 53/54; 53/168; 221/254
[58] Field of Search .................................... 141/170, 173, 141/174, 100, 102, 104, 105, 106, 107, 83, 98, 165, 171; 53/154, 168, 54, 502; 414/277, 280, 281, 282, 283; 221/224, 254, 258

[56] References Cited

U.S. PATENT DOCUMENTS

| | | |
|---|---|---|
| 2,523,517 | 9/1950 | Potter . |
| 2,632,588 | 3/1953 | Hoar, Jr. . |
| 3,018,595 | 1/1962 | Harris et al. . |
| 3,129,544 | 4/1964 | Klapes et al. . |
| 3,782,590 | 1/1974 | Apfel . |
| 4,501,339 | 2/1985 | Fukuda . |
| 4,640,322 | 2/1987 | Ballester ..................................... 141/5 |
| 4,655,338 | 4/1987 | Hershey et al. ........................ 198/395 |
| 4,674,259 | 6/1987 | Hills . |
| 4,693,057 | 9/1987 | Rittinger et al. . |
| 5,208,762 | 5/1993 | Charhut et al. . |
| 5,301,488 | 4/1994 | Ruhl et al. . |
| 5,348,061 | 9/1994 | Riley et al. . |
| 5,678,393 | 10/1997 | Yuyama et al. . |
| 5,762,116 | 6/1998 | Moore ..................................... 141/145 |

Primary Examiner—Henry J. Recla
Assistant Examiner—Peter deVore
Attorney, Agent, or Firm—Wenderoth, Lind & Ponack, L.L.P.

[57] ABSTRACT

A tablet packing apparatus of the present invention have a tablet feeding section 2 for feeding tablets, tablet vessel feeding sections 3 for feeding tablet vessels 11, and a tablet packing section 4 for packing tablets fed from the tablet feeding section 2, into a tablet vessel 11 fed from the tablet vessel feeding sections 3. The tablet feeding section comprises a plurality of feeder vessels 36 for storing different types of tablets and a tablet conveyor 27 for conveying the tablets discharged from the feeder vessels 36, to the tablet packing section 4. In the apparatus, the following restoring process is executed. After the apparatus is stopped due to abnormality, the tablets remaining in the guide paths 31 and the tablets conveyor means 27 are conveyed to the tablet packing section 4 by the tablets conveyor means 27 to recover them into the tablet vessel 11 and then the tablet vessel 11 is transferred to the container chamber 6 of the storage shelves 1.

16 Claims, 32 Drawing Sheets

6,119,737

TABLET PACKING APPARATUS

BACKGROUND OF THE INVENTION

The present invention relates to a tablet packing apparatus and more particularly to a tablet packing apparatus which is capable of automatically feeding both tablets (including capsules, pills, and the like) and tablet vessels and automatically storing on storage shelves the vessels packed with the tablets.

As such a conventional tablet packing apparatus, for example, in U.S. Pat. No. 5,348,061, there has been disclosed an apparatus which comprises a plurality of feeder vessels storing different types of tablets so as to allow the tablets discharged from the feeder vessels to be stored in a tablet vessel through a hopper provided in one place.

The tablet packing apparatus simply packs tablets in sequence into the tablet vessels arranged in a line. In the case that different types of tablets are packed for each tablet vessel, therefore, the apparatus is incapable of identifying the difference of tablet vessels from the appearance thereof, resulting in necessity of operator's checking what tablets were packed.

Besides, the tablet packing apparatus can not feed the another kind of tablets during the filling of one kind of tablets because tablets are filled in the tablet vessel at one place. The tablet packing apparatus is incapable of simultaneously dispensing a plurality of types of tablets.

SUMMARY OF THE INVENTION

It is an object of the present invention to provide a tablet packing apparatus which is capable of automatically feeding tablets and tablet vessels and which is capable of efficiently packing desired tablets into desired tablet vessels.

It is a further object of the present invention to provide a tablet packing apparatus which is capable of automatically being restored to former state even if the apparatus is stopped due to abnormality.

According to a first aspect of the present invention for achieving the first object, there is provided a tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, the tablet feeding section comprising:

a plurality of feeder vessels for storing different types of tablets for each feeder vessel and discharging relevant tablets on the basis of prescription data; and tablet conveyor means for conveying the tablets discharged from the feeder vessels, to the tablet packing section.

With this arrangement, relevant tablets can be conveyed to a packing position by the actuation and control of the feeder vessels and of the tablet conveyor means on the basis of prescription specifying data (which may be obtained from prescription data from a host computer or may be inputted from a terminal or the like).

It is preferable in that the tablet feeding section can be made compact, to provide feeder shelves which accommodate stack(s) of the feeder vessels and to provide common guide path(s) which vertically extend in the feeder shelves and into which the tablet discharging outlets of the feeder vessels open.

To provide a path shutter, which can be closed and opened, at the lower end(s) of the common guide path(s) is preferable in that the timing for feeding tablets can be set arbitrarily.

It is preferable in that the tablet feeding section can be made more compact, to provide at least two columns of the feeder shelves in parallel and a common hopper for receiving tablets discharged through the guide paths in the feeder shelves.

It is preferable in that the tablet feeding section can be made more compact; to provide the tablet conveyor means with at least two conveyor paths which are disposed in parallel below the common hopper and with conveyor vessels which are disposed on the conveyor paths so as to be capable of reciprocating; and to provide the common hopper with distributing means capable of feeding any one of the conveyor vessels with tablets.

To provide the common hopper with a hopper shutter which can be closed and opened to retain tablets temporarily is preferable in that tablets can be packed by a manual operation into a tablet vessel placed under the hopper.

The hopper shutter may be closed and opened with a closing/opening switch.

According to a second aspect of the present invention for achieving the first object, there is provided a tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, each tablet vessel feeding section comprising:

a stock container for storing a plurality of the tablet vessels;

vessel takeout means for taking out a tablet vessel from the stock container; and tablet vessel conveying means for conveying the tablet vessel taken out by the vessel takeout means.

With this arrangement, tablet vessels are taken out one by one from the stock containers by the vessel takeout means and conveyed to the tablet packing section by the tablet vessel feeding means, then packed with tablets.

The vessel takeout means may comprise:

vessel lifting members which are shaped like teeth of comb to project inward from a wall surface of the stock container and which are sloped upward with respect to the direction in which the vessel lifting members project; and elevating and lowering means for elevating the vessel lifting members projecting into the stock container and for lowering the vessel lifting members not projecting.

It is preferable in that tablet vessels can be reliably conveyed one by one, to provide the stock container with removing means for removing the tablet vessels held on the vessel lifting members except one tablet vessel held in the lateral position and for returning the tablet vessels into the stock container.

According to a third aspect of the present invention for achieving the first object, there is provided a tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, the tablet packing section comprising:

orientation judging means for judging the orientation of the tablet vessel fed from the tablet vessel feeding sections;

orientation reversing means for reversing the orientation of the tablet vessel; and controlling means for actuating and controlling the orientation reversing means on the basis of a judgment given by the orientation judging means to cause the opening of the tablet vessel to face upward.

With this arrangement, whichever orientation a tablet vessel has which has been conveyed by the tablet vessel feeding sections, the opening of the tablet vessel can be caused to face the side from which tablets are fed, with the determination of the orientation of the tablet vessel by the orientation judging means and with the actuation and control of the orientation reversing means by the controlling means.

According to a fourth aspect of the present invention for achieving the first object, there is provided a tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, the tablet packing section comprising:

a rotatable, disc-like, vessel holder section having on the outer circumference thereof a plurality of vessel receiving sections which are capable of holding the tablet vessels, so that any one of the vessel receiving sections can be positioned at a packing position.

It is preferable in that a tablet vessel having a desired size can be automatically fed to the tablet packing section;

to provide the vessel receiving sections in the vessel holder section which are capable of holding tablet vessels of different sizes for each vessel receiving section; and to provide size detecting means for detecting the sizes of the tablet vessels, and controlling means for actuating and controlling the vessel holder section on the basis of a detection signal given by the size detecting means to position at the packing position the vessel receiving section corresponding to the desired size of tablet vessel.

According to a fifth aspect of the present invention for achieving the first object, there is provided a tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, the tablet packing apparatus further comprising:

storage shelves having a plurality of container chambers for individually storing a tablet vessel packed with tablets and having display means for displaying relevant data out of prescription data upon the storage of a tablet vessel into one of the container chambers.

For example, the prescription data includes feeder vessel number(s) indicating what feeder vessel(s) have fed the tablets and the count of the tablets indicating the number of the tablets to be prescribed.

With this arrangement, the types, items, and the like of the tablets packed into a tablet vessel can be easily identified.

It is preferable in that the delivery of a tablet vessel to a container chamber in the storage shelves after the packing of tablets into the tablet vessel can be automated, to provide gripping means for gripping a tablet vessel packed with tablets and packed vessel delivering means for delivering the tablet vessel from the packing position to a container chamber in the storage shelves with the travel of the gripping means.

A tablet vessel can be delivered at all times to the position where jobs can be easily done, with the provision of vessel detecting means for detecting the presence or absence of a tablet vessel in each container chamber in the storage shelves, and of controlling means for actuating and controlling the packed vessel delivering means on the basis of a detection signal given by the vessel detecting means to deliver a tablet vessel to the vacant container chamber from which the tablet vessel could be taken out most easily.

The period of time required for the delivery of a tablet vessel can be reduced and the efficiency on job can be improved, with the provision of vessel detecting means for detecting the presence or absence of a tablet vessel in each container chamber in the storage shelves, and of controlling means for actuating and controlling the packed vessel delivering means on the basis of a detection signal given by the vessel detecting means to deliver a tablet vessel to the vacant container chamber to which the tablet vessel can be delivered in the shortest period of time.

According to a sixth aspect of the present invention for achieving the first object, there is provided a tablet packing apparatus in which a given number of tablets are packed into each tablet vessel of a type at a packing position, the tablet packing apparatus comprising:

stock containers for storing tablet vessels of which the sizes are different for each stock container;

vessel takeout means for taking out a tablet vessel from the stock containers;

tablet vessel feeding means for conveying the tablet vessel taken out by the vessel takeout means;

storage shelves having a plurality of container chambers for individually storing a tablet vessel packed with tablets;

packed vessel delivering means which has gripping means for gripping a tablet vessel and which delivers the tablet vessel from the tablet packing position to a container chamber in the storage shelves with the travel of the gripping means; and controlling means for causing the vessel takeout means and the tablet vessel feeding means to supply from a stock container a tablet vessel having the same size as the tablet vessel which has been just delivered to a container chamber in the storage shelves by the packed vessel delivering means.

According to a seventh aspect of the present invention for achieving the first object, there is provided a tablet packing apparatus in which a given number of tablets are packed into each tablet vessel of a type at a packing position, the tablet packing apparatus comprising:

stock containers for storing tablet vessels of which the sizes are different for each stock container;

vessel takeout means for taking out a tablet vessel from the stock containers;

tablet vessel feeding means for conveying the tablet vessel taken out by the vessel takeout means;

size detecting means for detecting the size of the tablet vessel delivered by the tablet vessel feeding means;

proper vessel judging means for judging whether the tablet vessel has a desired size or not by the comparison between a first size data of tablet vessel according to prescription data and a second size data of the tablet vessel detected by the size detecting means; and alarm means for alarming an operator in the case that the tablet vessel has been judged not to have the desired size on the basis of judgment signal from the proper vessel judging means.

It is preferable in that the occurrence of such a problem as a failure to pack all the tablets prescribed in a tablet vessel can be prevented, to provide eliminating means for eliminating the tablet vessel which has been judged not to have a desired size by the proper vessel judging means.

In the case that a tablet vessel has been eliminated by the eliminating means, the proper vessel judging means may actuate and control the vessel takeout means and the tablet vessel feeding means to feed a tablet vessel of the desired size from one of the stock containers.

According to a eighth aspect of the present invention for achieving the first object, there is provided a tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, wherein:

the tablet feeding section comprises a plurality of feeder vessels for storing different types of tablets, guide paths for holding tablets discharged from the tablet feeding section, and tablets conveyor means for conveying the tablets held in the guide paths to the tablet packing section; and the apparatus further comprises storage shelves having a plurality of container chambers for individually storing a tablet vessel packed with tablets at the tablet packing section, and control means for executing a restoring process, whereby, after the apparatus is stopped due to abnormality, the tablets remaining in the guide paths and the tablets conveyor means are conveyed to the tablet packing section by the tablets conveyor means to recover them into the tablet vessel and then the tablet vessel is transferred to the container chamber of the storage shelves.

It is preferable in that confirmation of the recovery of remaining tablets become easier and operational efficiency is enhanced to further provide a display section for indicating that the tablet vessel in which recovered tablets are packed is transferred to the container chamber of the storage shelves.

It is preferable in that the recovered tablet can be returned to the original feeder vessel in order to reuse them that the display section distinctly indicates which feeder vessel is the recovery tablets discharged from.

It is preferable in that proper process can be executed based on previously processing data that: it is selectable that the remaining tablet packing process is resumed based on previously processing data without executing the restoring process, or that the previously processing data is cleared to execute the restoring process.

BRIEF DESCRIPTION OF THE DRAWINGS

Other objects and features of the present invention will become clear from the following detail description with reference to the accompanying drawings in which.

DETAILED DESCRIPTION OF THE PREFERRED EMBODIMENTS

Figure 1:
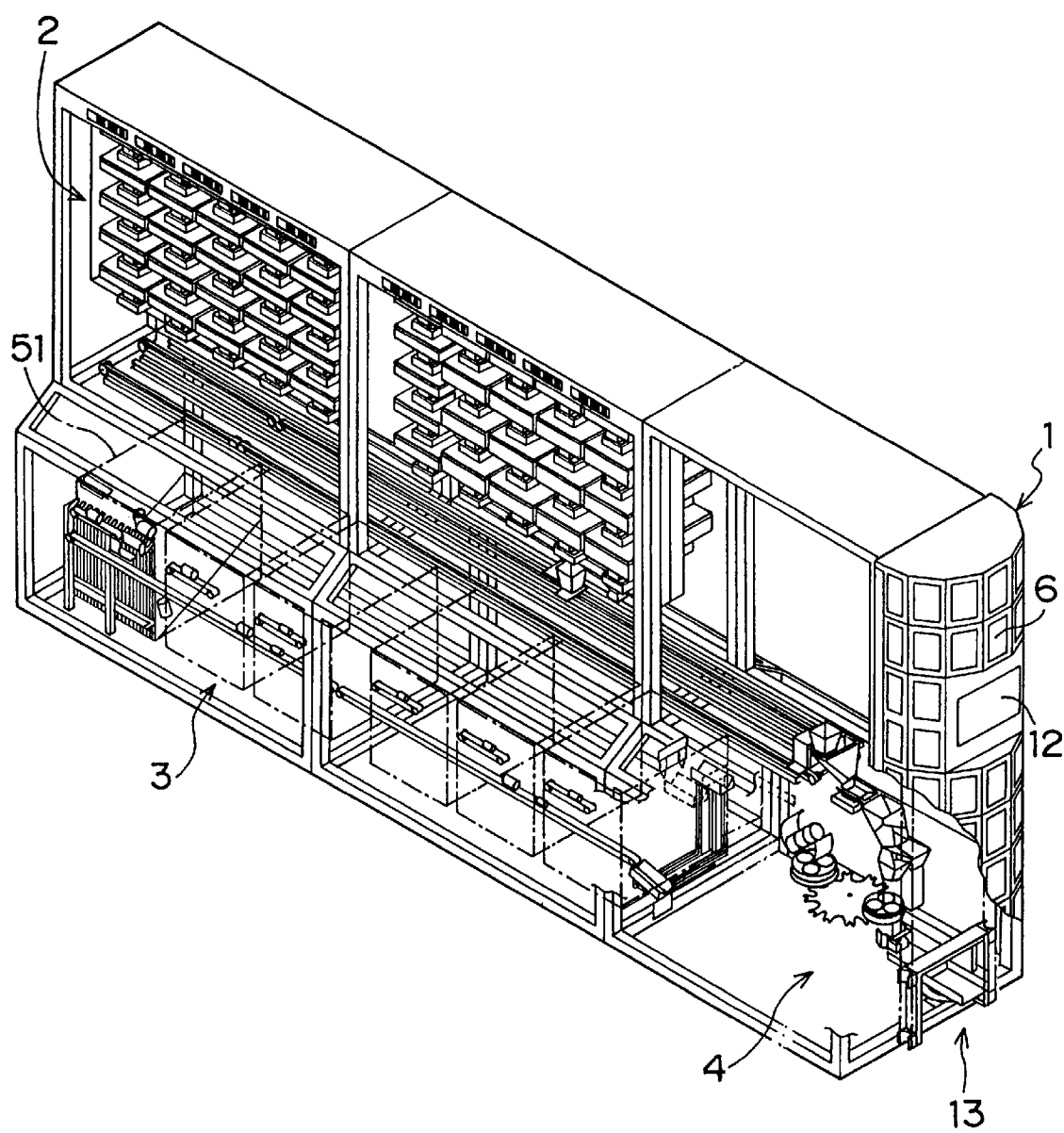
FIG. 1 is a perspective overall view illustrating a tablet packing apparatus in accordance with the invention.

FIG. 1 shows a tablet packing apparatus in accordance with the invention. The apparatus generally comprises storage shelves 1 provided on one end side of the apparatus, a tablet feeding section 2 provided in the upper part of the apparatus, tablet vessel feeding sections 3 provided under the tablet feeding section 2, a tablet packing section 4 provided between the storage shelves 1 and the tablet vessel feeding sections 3, and a controlling section 5 (see FIG. 17).

Figure 2A:
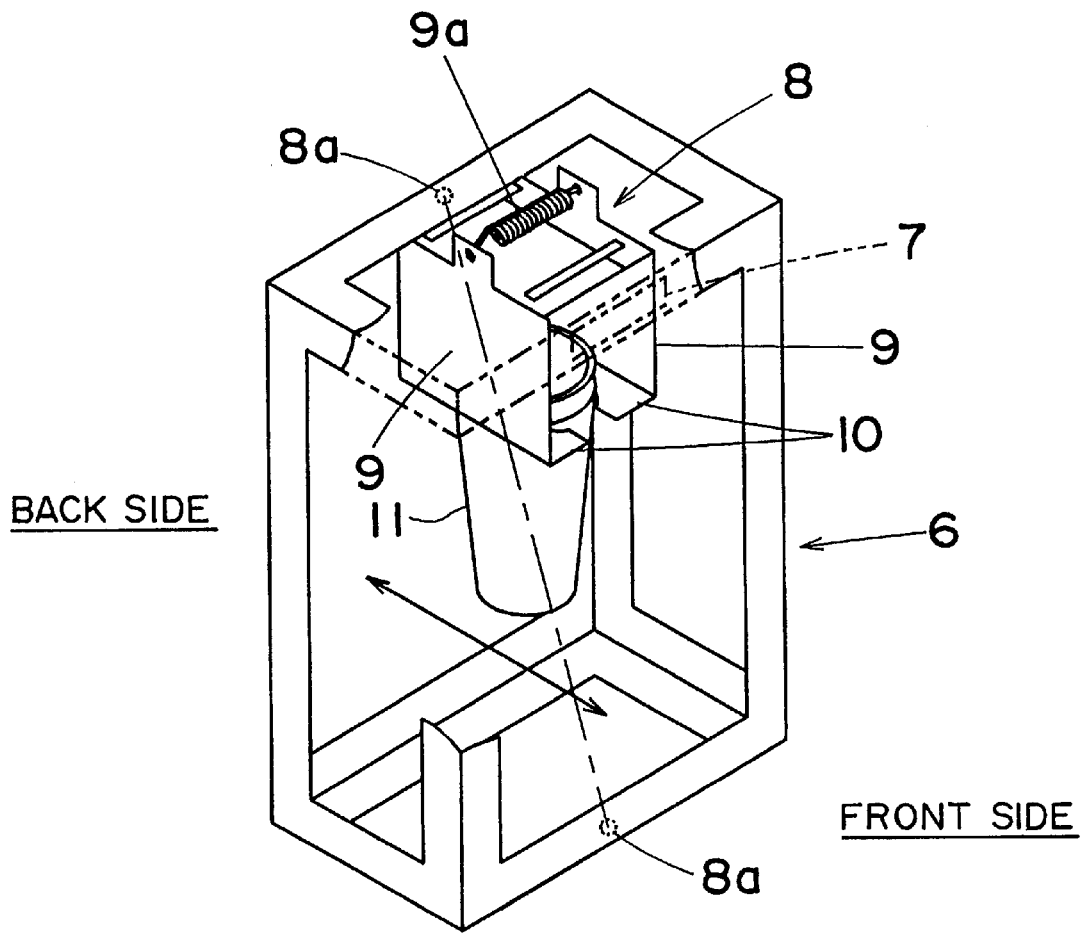
FIG. 2A is a perspective view illustrating a container chamber in storage shelves in FIG. 1.
Figure 2B:
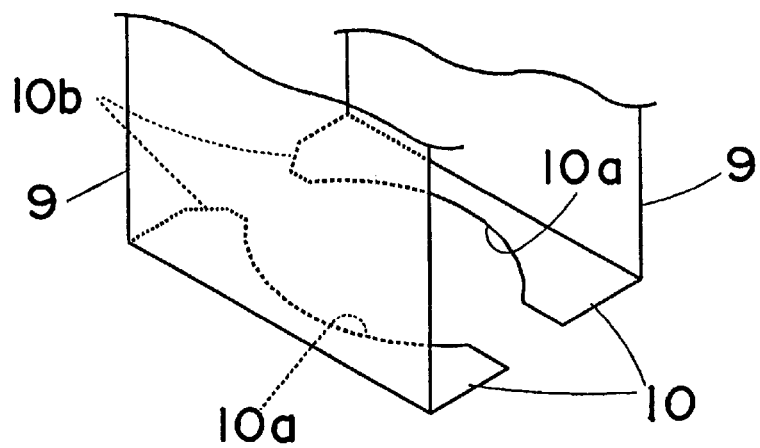
FIG. 2B is a fragmentary perspective view in FIG. 2A.

The storage shelves 1 have a generally semi-cylindrical shape and includes a plurality of container chambers 6. As shown in FIG. 2A, each container chamber 6 has a rectangular frame body in which at least the surfaces opposed in the direction shown by an arrow in FIG. 2A are opened. A display 7 is provided on the upper part of the front side of the container chamber 6. In the embodiment, the tablet vessel number and the tablet count number is displayed on the display 7. The container chamber 6 is also provided with a vessel holder 8. In the vessel holder 8, a pair of holding plates 9 are opposed to each other in a horizontal direction. The holding plates 9 are biased by a spring 9a in the direction in which the holding plates 9 come close to each other. At the lower ends of the holding plates 9 are formed holding lugs 10 which extend in the direction in which the holding plates 9 are opposed As shown in FIG. 2B, on opposed edges of the holding lugs 10 are formed recesses 10a which have a generally elliptic shape so as to hold a tablet vessel 11. At the back side corners of the holding lugs 10 are formed cutouts 10b which are spread out toward the inside. The cutouts 10b are provided to facilitate the insertion of the tablet vessel 11 into the recesses 10a. A vessel sensor 8a is capable of detecting whether the tablet vessel 11 is held by the vessel holder 8 in the container chamber 6 or not.

As shown in FIG. 1, in the center part of the outer circumference of the storage shelves 1 is provided a touch panel 12, instead of container chambers 6. The touch panel 12 is provided to allow instruction data on the prescription to be inputted directly.

Figure 3:
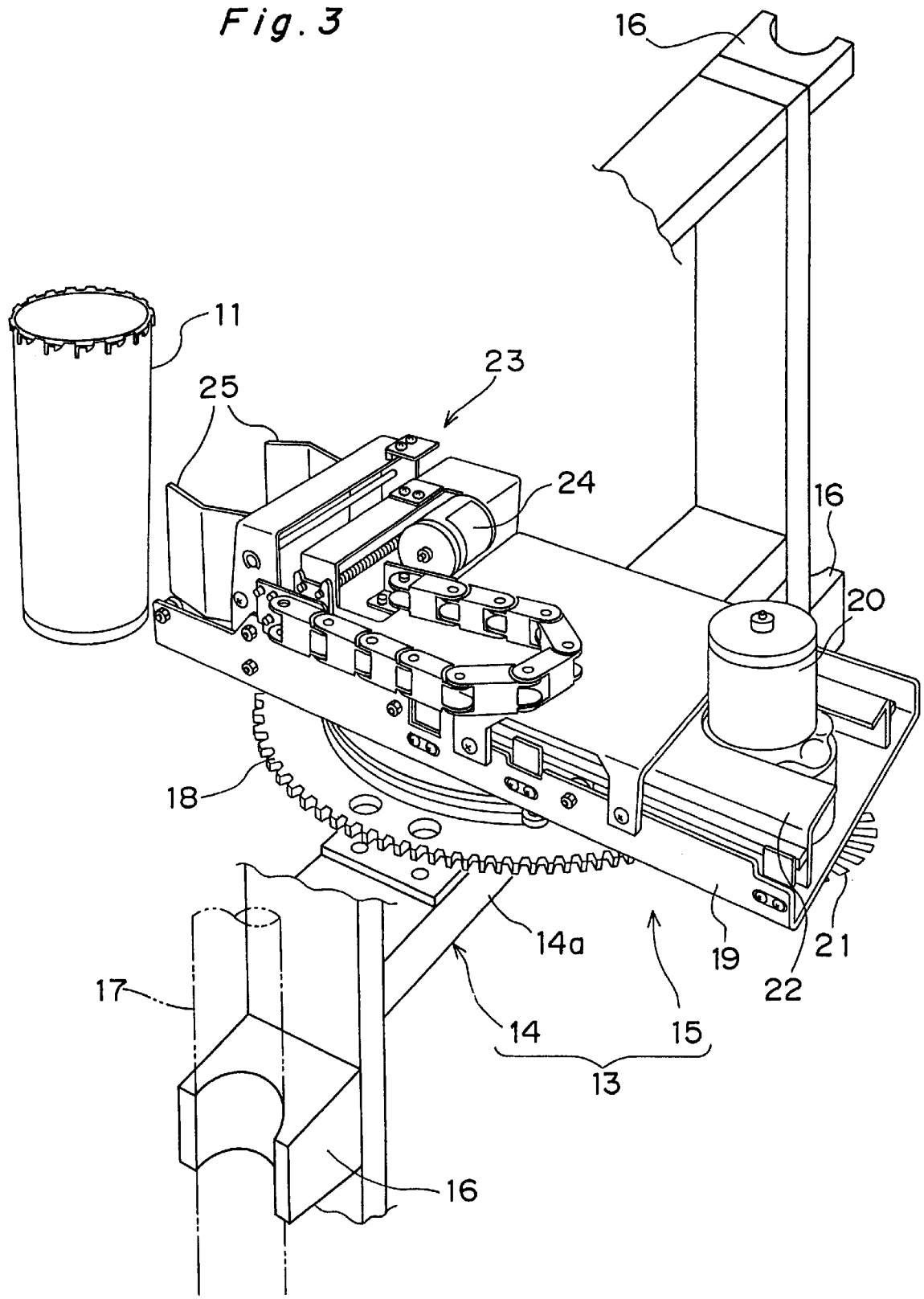
FIG. 3 is a perspective view illustrating an arm member in FIG. 1.

Inside the storage shelves 1 is provided a conveyor 13 for packed vessel. In the conveyor 13 for packed vessel, as shown in FIG. 3, an arm member 15 is pivotally mounted to a rectangular frame 14 which is capable of traveling vertically.

A bearing recess 16 is provided at each of the upper and lower ends of both outside surfaces of the rectangular frame 14. The bearing recesses 16 are in sliding contact with guide shafts 17 standing at a given interval behind the storage shelves 1. The conveyor 13 for packed vessel can be moved vertically through the medium of a belt (not shown) by the driving of a motor (not shown). A first driving gear 18 is fixed to the center of the lower horizontal plate 14a of the rectangular frame 14.

The arm member 15 comprises an arm body 19 mounted rotatably on the center shaft of the first driving gear 18. A first driving motor 20 is provided on one end portion of the arm body 19. To the rotating shaft of the first driving motor 20 which protrudes from the bottom surface of the arm body 19 are fixed position detection plates 21 and a second driving gear (not shown) engaged with the first driving gear 18. A rotational position of the second driving gear can be determined by the detection of the position detection plates 21 by a sensor (not shown). With this arrangement, the arm member 15 is rotated in forward or reverse direction in the range of 180° by the drive of the first driving motor 20. On the top surface of the arm body 19 is provided a sliding member 22 which is driven by a built-in, second driving motor (not shown) and thereby reciprocates in the longitudinal direction. On one end portion of the sliding member 22 (on the side opposite to the first driving motor 20) is provided a gripping member 23. The gripping member 23 comprises a pair of gripping pieces 25 which are driven through a gear not shown by a third driving motor 24 provided on the sliding member 22 and thereby open and close.

The tablet feeding section 2 comprises a tablet container section 26 and a tablet conveyor section 27.

Figure 4:
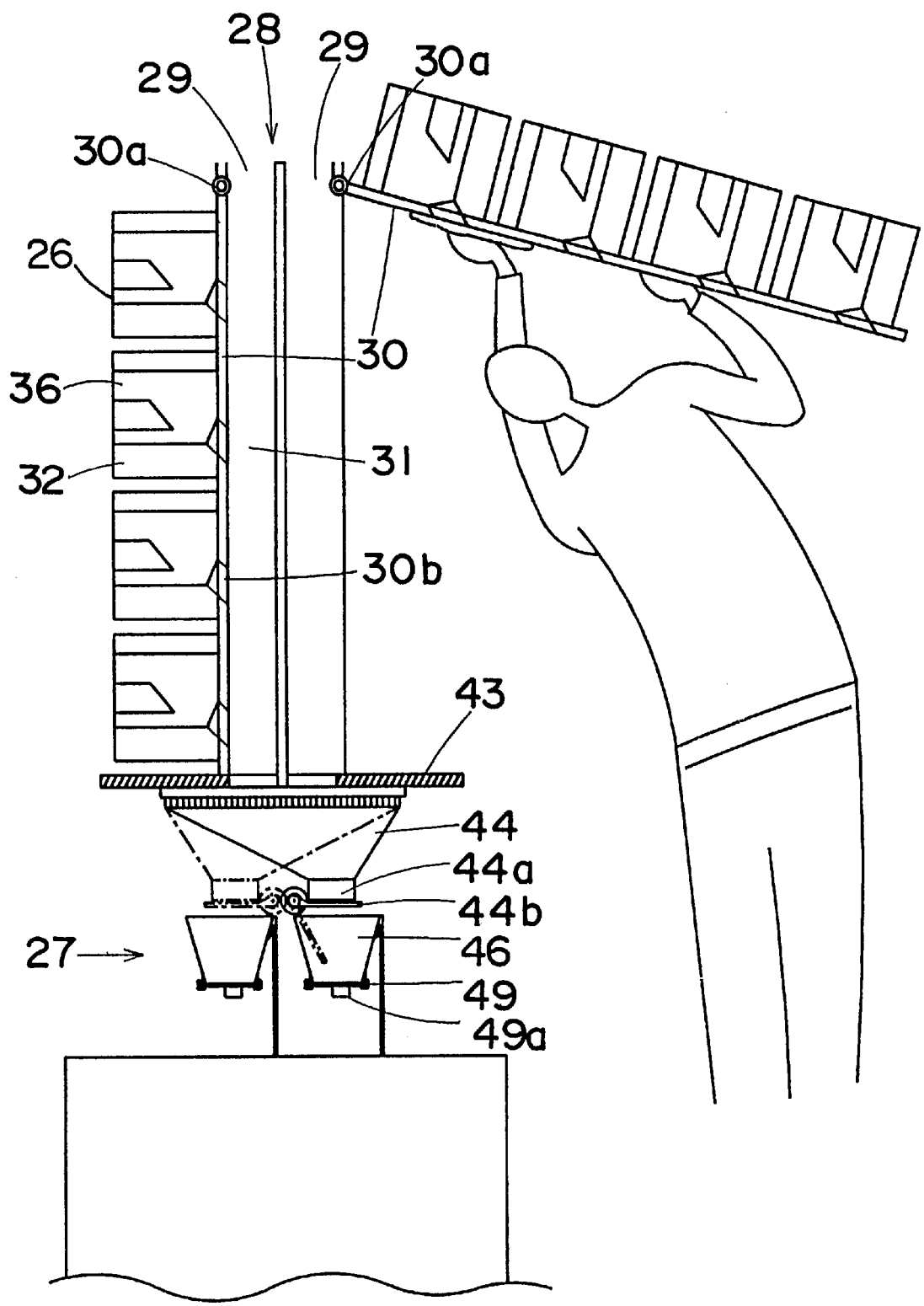
FIG. 4 is a sectional view illustrating a tablet container section in FIG. 1.

In the tablet container section 26, as partly shown in FIG. 4, grooves 29 extending vertically are provided on both sides of a vertical wall 28. Each groove 29 is covered with a shelf member 30 provided pivotably about a pivot 30a so that common guide paths 31 are formed. A plurality of openings 30b for discharging tablets are provided in a vertical line on each shelf member 30. A plurality of motor bases 32 corresponding to the openings 30b for discharging tablets are mounted to the outer surface of each shelf member 30.

Figure 5A:
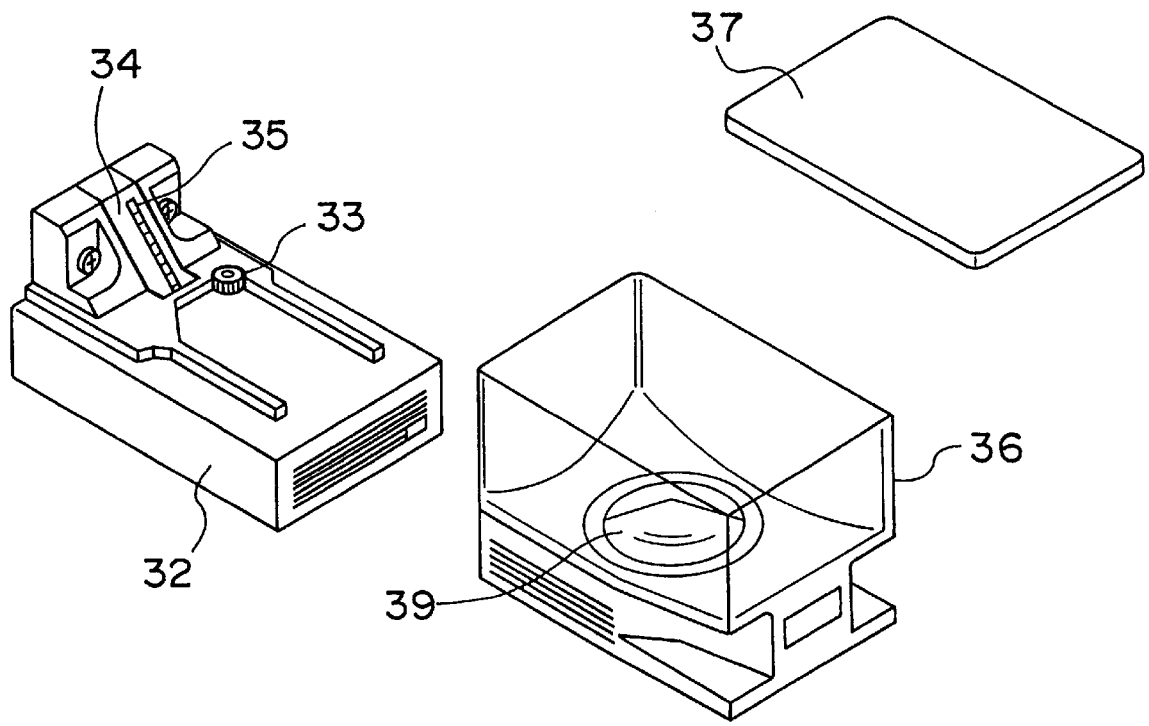
FIG. 5A is an exploded perspective view illustrating a motor base and a feeder vessel in FIG. 4.
Figure 6A:
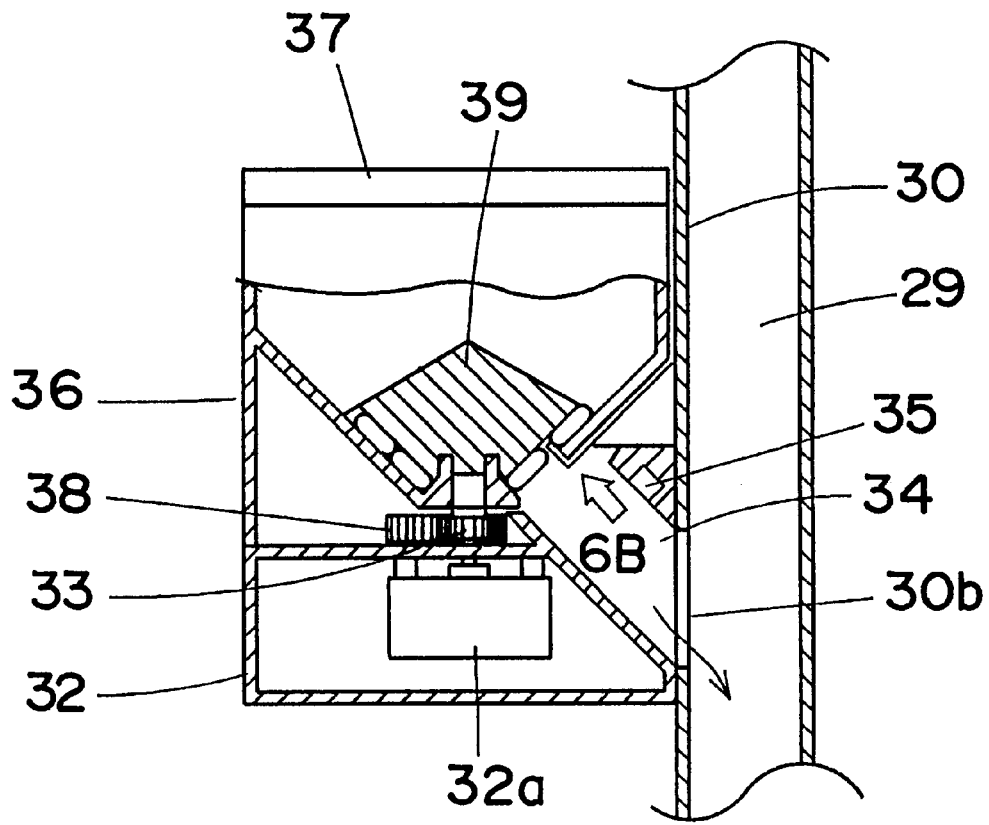
FIG. 6A is a sectional view illustrating a motor base and a feeder vessel in FIG. 4.

As shown in FIGS. 5A and 6A, each motor base 32 has a built-in driving motor 32a. A driving gear 33 to which the power from the driving motor 32a is transferred is exposed on the top surface of the motor base 32. A fall guide path 34 is formed on one end side of the motor base 32. A tablet detecting sensor 35 is provided on the inner wall of the fall guide path 34, so that the tablets discharged through the fall guide path 34 can be detected (counted).

A feeder vessel 36 is detachably mounted to the motor base 32. The feeder vessel 36 is generally in the shape of a rectangle which opens upward and which can be covered with a cover 37. In the feeder vessel 36 is stored tablets. At the bottom of the feeder vessel 36 is provided a rotor 39 having a gear 38 at the lower end thereof.

Figure 6B:
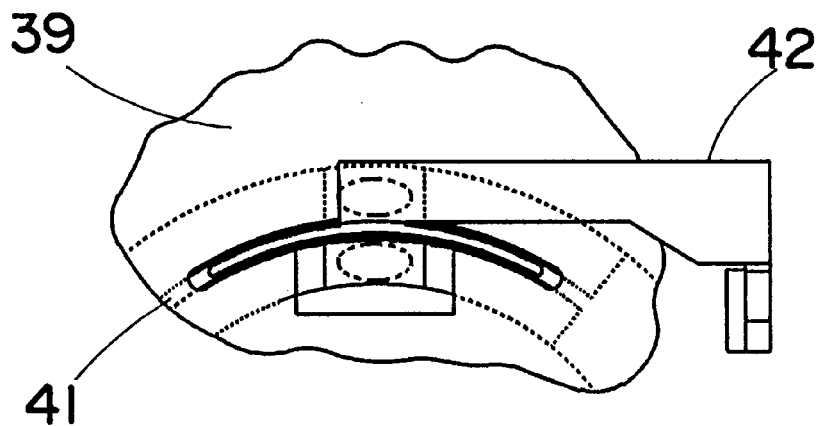
FIG. 6B is a fragmentary view taken in the direction of the arrow 6B in FIG. 6A illustrating a dividing fin in FIG. 6A.
Figure 7A:
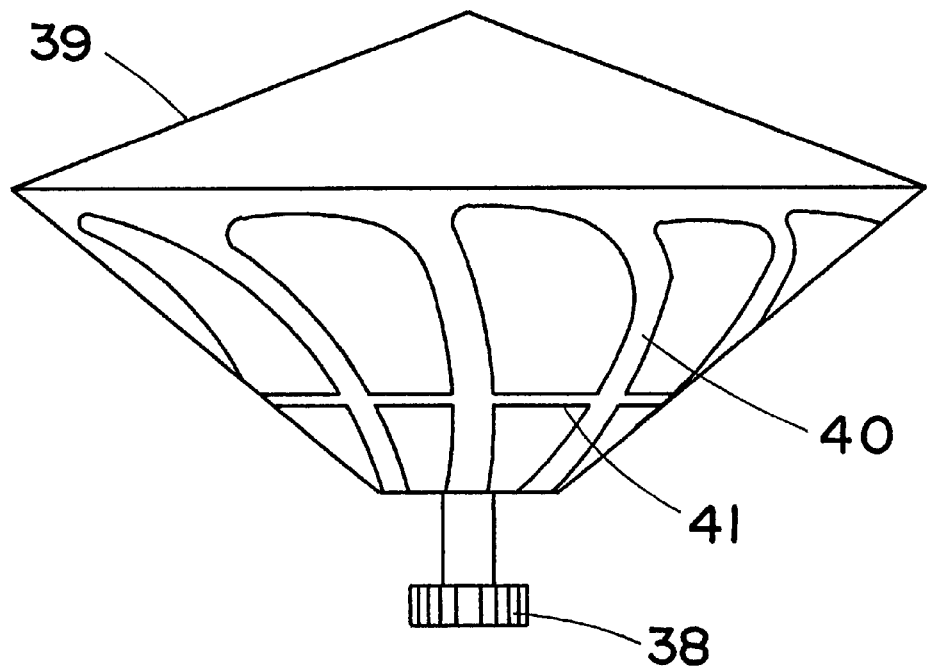
FIG. 7A is a front view illustrating a rotor provided in a feeder vessel in FIG. 4.
Figure 7B:
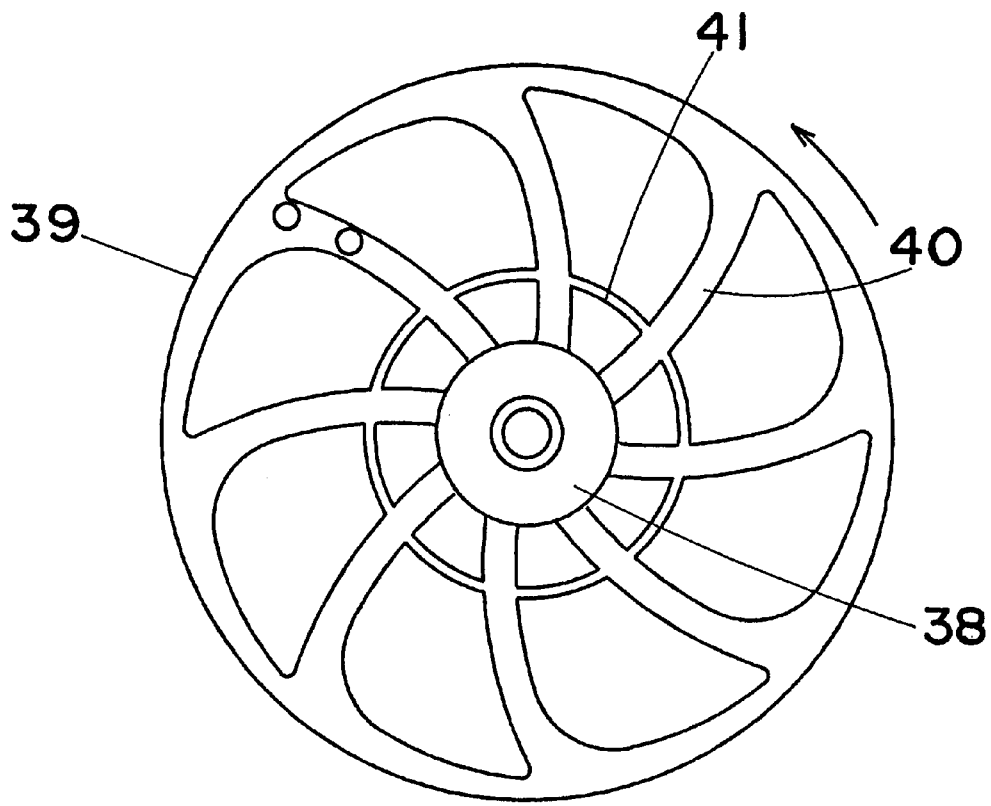
FIG. 7B is a bottom view illustrating the rotor in FIG. 7A.

As shown in FIGS. 7A and 7B, the rotor 39 has conical surfaces on its upper and lower parts. The attachment of the feeder vessel 36 to the motor base 32 engages the gear 38 with the gear 33 on the motor base 32. On the lower conical surface of the rotor 39 are formed tablet guiding grooves 40 extending spirally toward the center of the surface, and are formed dividing grooves 41 dividing each tablet guiding groove 40 into two parts in the middle thereof. The spiral direction of the tablet guiding grooves 40 toward the center of rotation of the rotor 39 is opposite to the direction of rotation of the rotor 39 (opposite to the direction shown in the arrow in FIG. 7B). In the dividing grooves 41 is provided a dividing fin 42. With the rotation of the rotor 39 as shown in FIG. 6B, the dividing fin 42 divides the line of tablets that pass through the tablet guiding grooves 40.

Figure 5B:
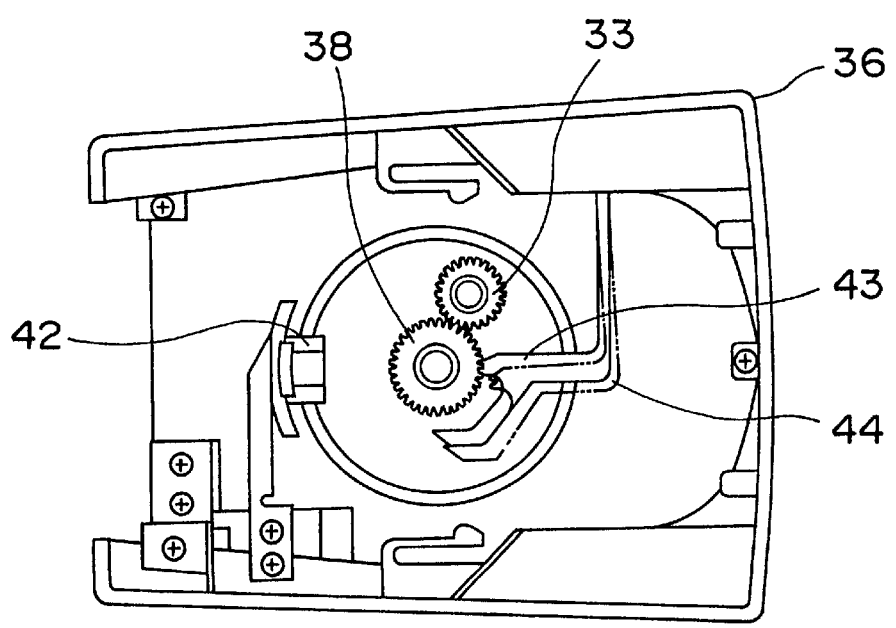
FIG. 5B is a bottom view illustrating the feeder vessel in FIG. 5B.

As shown in FIG. 5B, a gear stopper 43 is capable of engaging with the gear 38 in the feeder vessel 36 when the feeder vessel 36 is detached from the motor base 32 and disengaged from the gear 38 when the feeder vessel 36 is mounted. The gear stopper 43 is biased against the gear 38 by a stopper spring 44. Even though the feeder vessel 36 is detached from the motor base 32, the above arrangement allows the gear stopper 43 to engage with the gear 38 and prevents the rotor 39 from rotating, so that tablets cannot fall out of the feeder vessel 36.

In the tablet feeding section 2, when the driving motor 32a in the motor base 32 is driven with the feeder vessel 36 attached to the motor base 32, the rotor 39 is rotated through the medium of the gear 33 and of the driving gear 38, thereby tablets move in a line toward the center of rotation, forming a line for each tablet guiding groove 40. As mentioned above, the tablet guiding grooves 40 are formed so as to extend spirally toward the center of rotation of the rotor 39 in the direction opposite to the direction of rotation of the rotor 39. Tablets are therefore forced to move toward the center of rotation regardless of the centrifugal forces exerted on the tablets by the rotation of the rotor 39. The line of tablets is divided by the dividing fin 42 before each tablet guiding grooves 40 communicates with the fall guide path 34, and then fall one by one into the common guide path 31 through the fall guide path 34.

As shown in FIG. 4, at the lower ends of the common guide paths 31 are provided a shutter 43 for temporarily retaining the tablets which have fallen from the fall guide path 34. A hopper 44 is rotatably and detachably disposed under the shutter 43. The hopper 44 has a tablet discharge opening 44a at the offset position of the bottom. The tablet discharge opening 44a can be closed and opened by a closing/opening valve 44b. The hopper 44 is capable of rotating by 180°, so that the tablet discharge opening 44a is set at each position where tablets can be supplied into any one of conveyor vessels 46 in the tablet conveyor section 27, which will be described below.

The tablet conveyor section 27 comprises two lines of conveyor belts 48 and conveyor vessels 46. The conveyor belts 48 are looped between a pair of pulleys 47. The conveyor vessels 46 are supported on the conveyor belts 48 by a support frame 46a so as to be reciprocated. Rectangular apertures 46c are provided in a line on a bottom plate 46b of the support frame 46a (see FIGS. 4, 14, and 15). The conveyor belt 48 has continual guide projections 48a, which engage with the rectangular apertures 46c to allow the conveyor vessel 46 to be moved. The bottom of the conveyor vessel 46 comprises a shutter 49 which can be opened and closed. The shutter 49 is biased, as shown in FIG. 15, by a spring 50 provided at one end of the shutter 49 so as to shut the bottom of the conveyor vessel 46. A protrusion 49a is formed at one end on the downside surface of the shutter 49.

Figure 8:
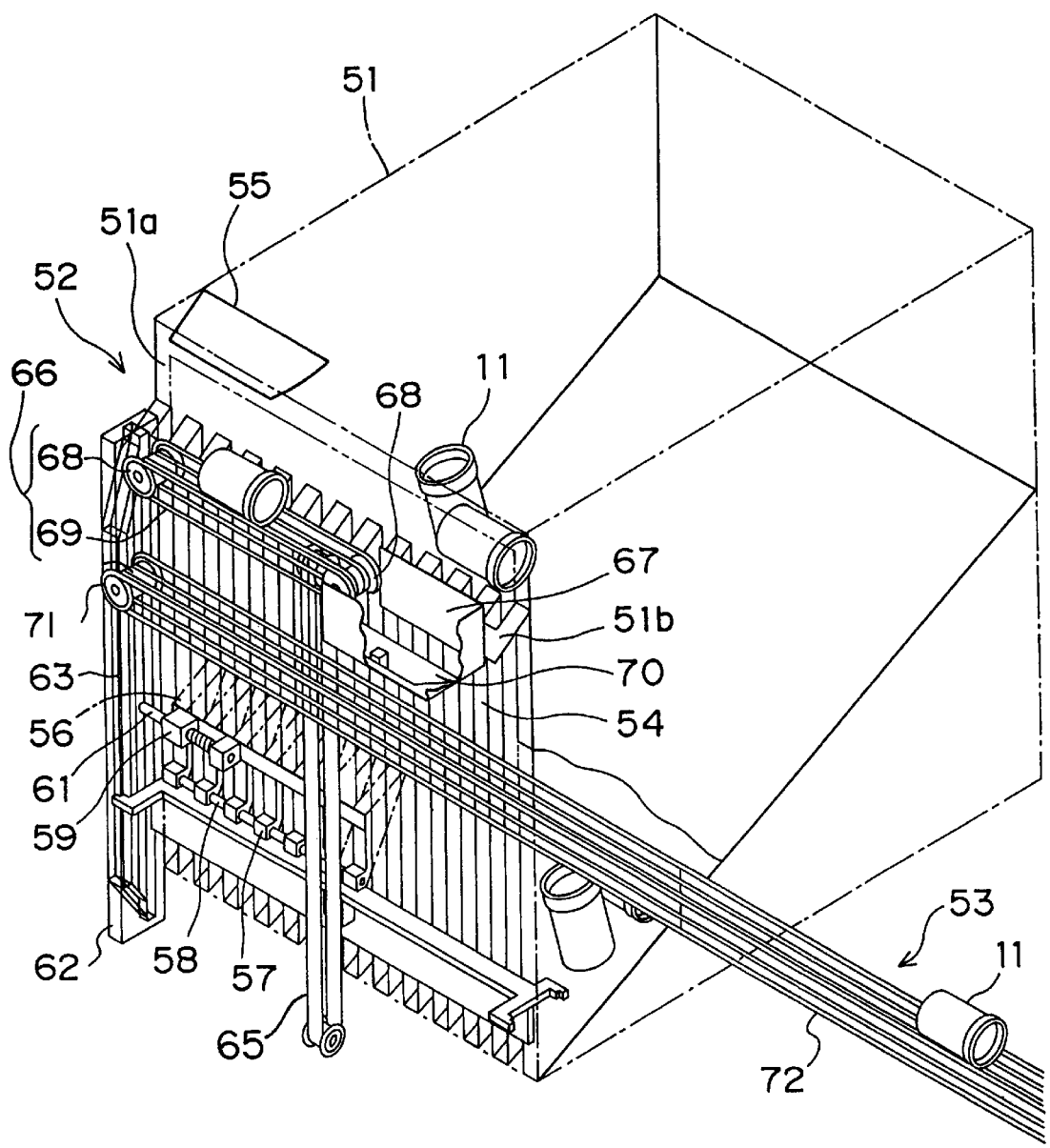
FIG. 8 is a perspective view illustrating a stock container in FIG. 1.

As shown in FIG. 8, each tablet vessel feeding section 3 comprises a stock container 51 for storing empty tablet vessels 11, a vessel takeout section 52 for taking out tablet vessels 11 one by one from the stock container 51, and an empty vessel conveyor 53 for conveying the tablet vessel 11 taken out from the stock container 51 by the vessel takeout section 52. The tablet vessel feeding sections 3 are disposed in a line as shown in FIG. 1. The sizes (outside diameters or lengths) of empty tablet vessels 11 stored in the stock containers 51 are different for each stock container 51.

A plurality of slits 54 extending vertically are provided in parallel on a side wall 51a of the stock container 51. The upper end portion of the side wall 51a is so bent as to form an opening, and the bent portion 51b is gently sloped downward toward the end thereof. The bottom surface of the stock container 51 is also gently sloped downward toward the side wall 51a. In the vicinity of the top surface of the stock container 51, a tilting member (vessel removing means) 55 is provided so as to project upward with a slant from the side wall 51a. The tilting member 55 is provided so that only the tablet vessel 11 lifted up in the horizontal position by the vessel takeout section 52 which will be described below can be taken out.

Figure 9:
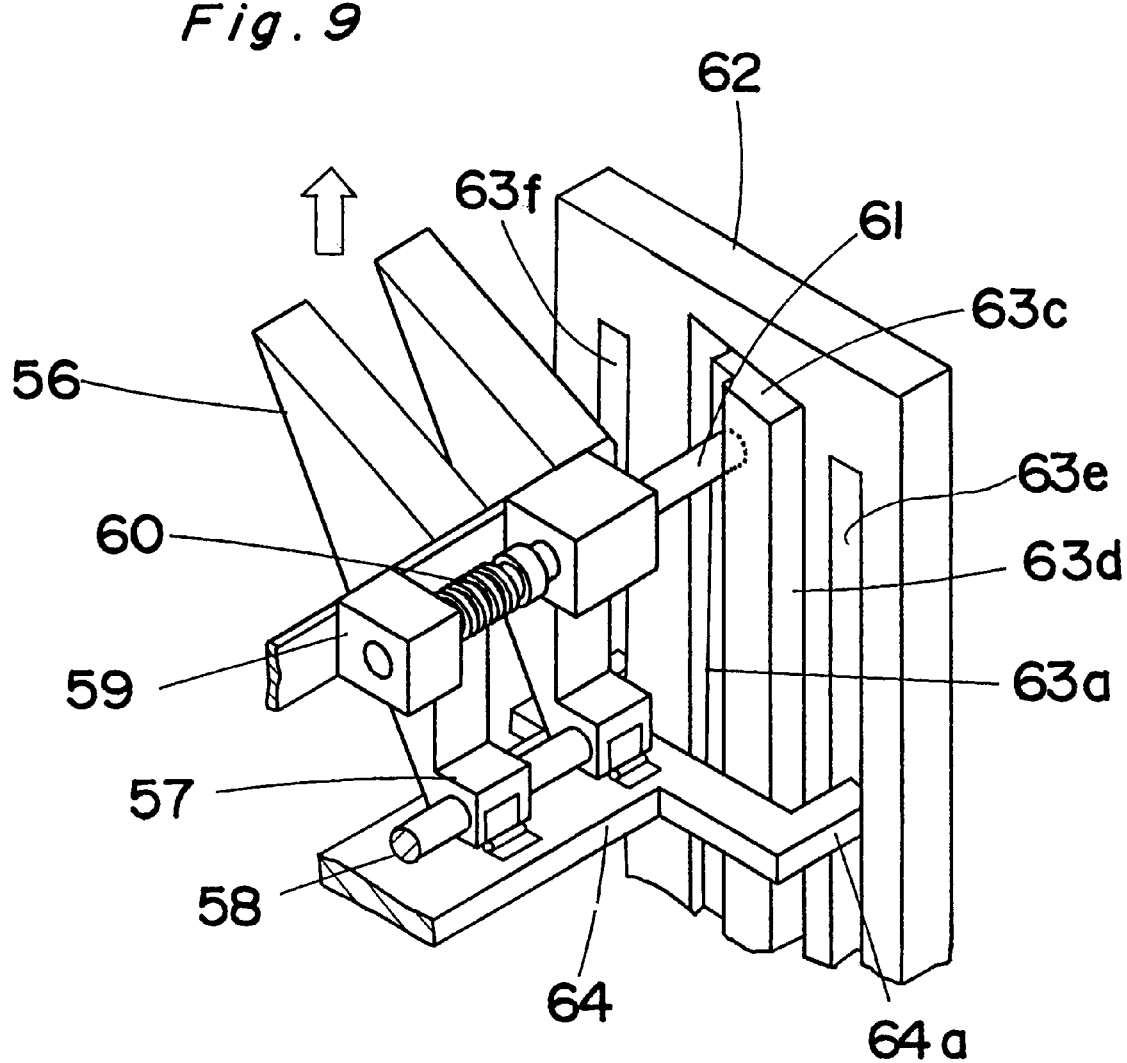
FIG. 9 is a perspective view illustrating lifting members and a guiding plate in FIG. 8.

As shown in FIG. 9, each vessel takeout section 52 has lifting members 56 each having a generally triangular shape and projecting through the slits 54 on the stock container 51. The lifting members 56 are linked together by a first rod 58 integrated with first bearings 57. Each of two lifting members 56 on both sides of the vessel takeout section 53 is provided with a second bearing 59 projecting therefrom. Each second bearing 59 is inserted with a second rod 61 biased laterally by a spring 60. The end of the second rod 61 is in sliding engagement with a first guiding groove 63 on a guiding plate 62. The first guiding groove 63 is formed in a quadrangle as shown in FIGS. 10. A vertical inside groove 63a and a slanting lower groove 63b are shallower, and a slanting top groove 63c is deeper. A vertical outside groove 63d smoothly connects the slanting top groove 63c to the slanting lower groove 63b. The bottoms of the first bearings 57 are pivotally connected to a plate-like member 64. On each end portion of the plate-like member 64 is formed stoppers 64a which are in engagement with either of second guiding grooves 63e, 63f on the guiding plate 62 and which is capable of moving vertically. The lifting members 56 are vertically moved by the driving of a driving motor (not shown) through the medium of a belt 65.

As shown in FIG. 8, the vessel takeout section 52 has a conveyor 66 and a vessel conveyance standby chamber 67 at the end of the bent portion 51b of the stock container 51. In the conveyor 66, conveyor ropes 69 are looped between a pair of pulleys 68. The pulleys 68 can be rotated in forward and reverse directions by the driving of a motor not shown. The distance between the conveyor ropes 69 has to be smaller than the outside diameter of a tablet vessel 11 to be conveyed. The range over which the conveyor ropes 69 extend coincides generally with the range over which the lifting members 56 are disposed. The vessel conveyance standby chamber 67 has such capacity that just one tablet vessel 11 is accommodated therein. The bottom surface of the vessel conveyance standby chamber 67 comprises a shutter 70 which can be opened and closed.

The empty vessel conveyor 53 is provided below the vessel conveyance standby chambers 67 along the stock containers 51 arranged in line. In the same manner as the conveyor 66, the empty vessel conveyor 53 comprises a pair of pulleys 71 and a pair of conveyor ropes 72 looped between the pair of pulleys 71.

Figure 11:
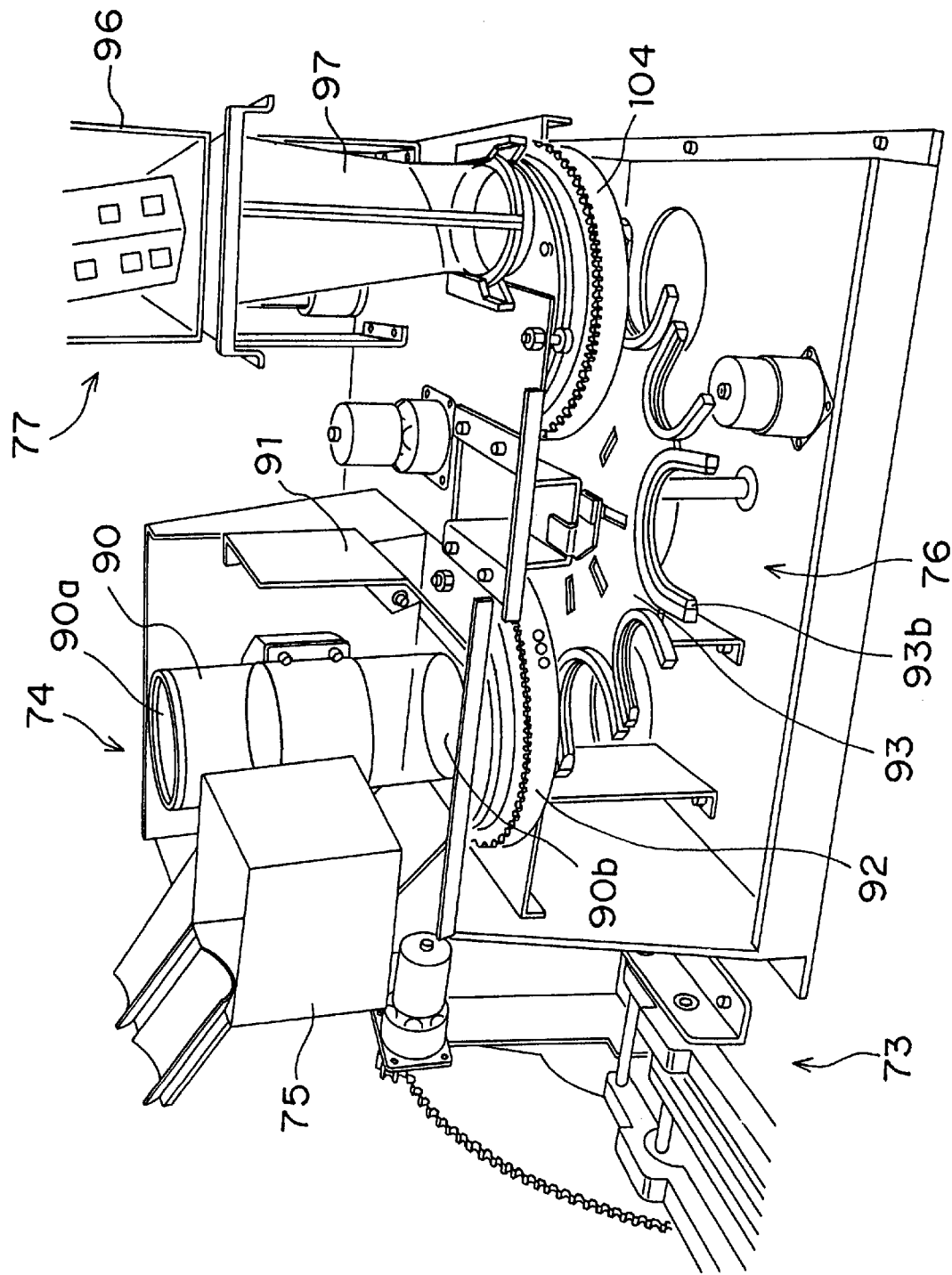
FIG. 11 is a fragmentary perspective view illustrating the vicinity of a tablet packing section in FIG. 1.

As shown in FIG. 11, the tablet packing section 4 comprises a vessel judging section 73, a vessel feeding section 74, a discharging box 75, a vessel holder section 76, and a tablet weighing section 77.

Figure 12:
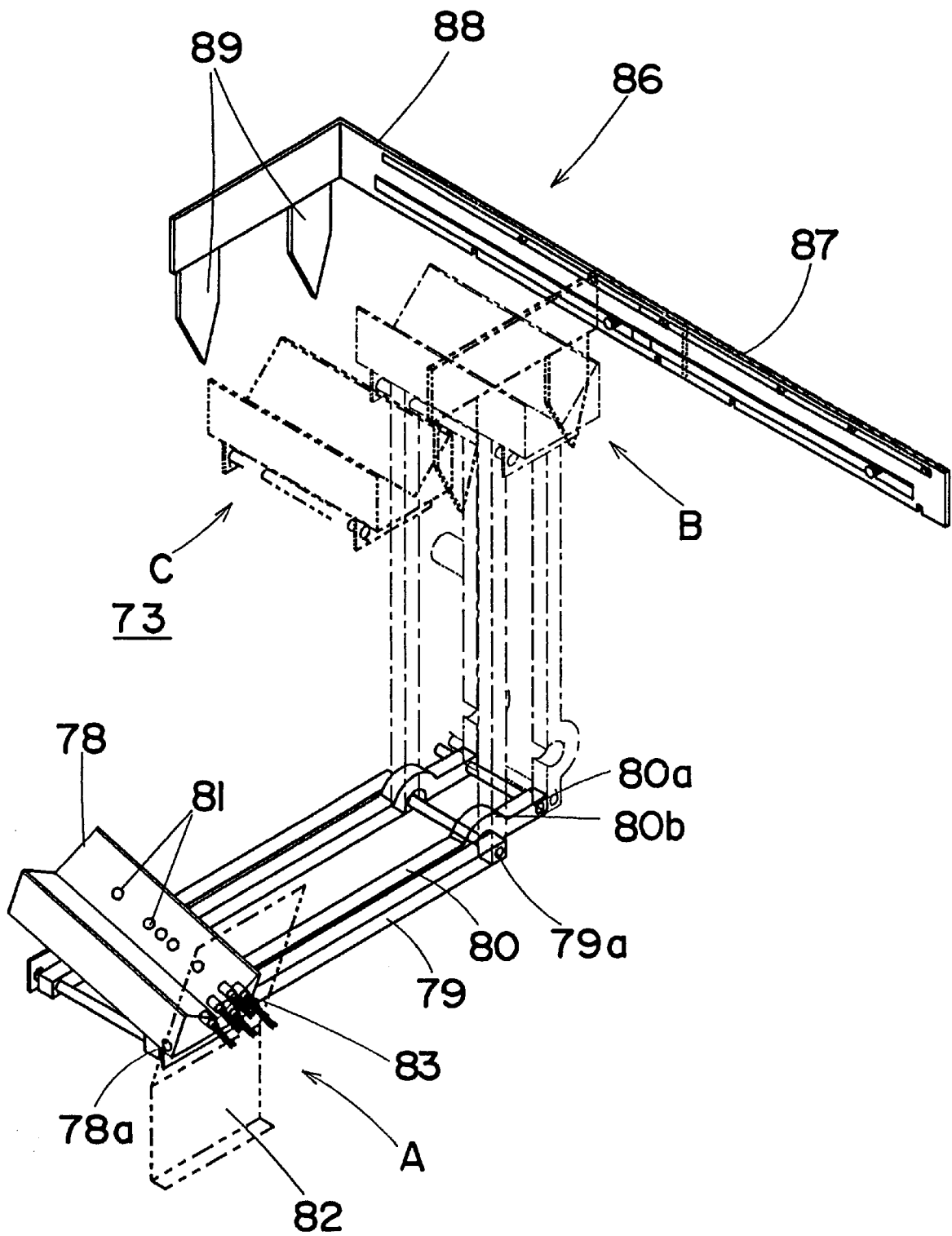
FIG. 12 is a fragmentary perspective view illustrating a vessel judging section in FIG. 1.

As shown in FIG. 12, the vessel judging section 73 has a vessel positioning section 78 having a section shaped generally like a character "V." The vessel positioning section 78 is so arranged as to be pivotable about a pivot 78a provided at one end thereof. The vessel positioning section 78 is pivotably supported by the distal ends of a pair of first legs 79 which pivot about a first pivot 79a and by the distal ends of a pair of second legs 80 which pivot about a second pivot 80a. The first and second legs 79 and 80 are capable of pivoting so as to take a horizontal position A, a vertical position B, and a generally vertical position C. Recesses 80b each shaped generally like a character "C" are formed on the lower sides of the second legs 80 to avoid the interference with the first pivot 79a in the horizontal position A.

A plurality of length detecting sensors 81 are provided on one of the inside surfaces of the vessel positioning section 78. The length detecting sensors 81 are disposed at predetermined distances from one side edge of the vessel positioning section 78. When a tablet vessel 11 is positioned on the vessel positioning section 78, the length detecting sensors 81 detect the length of the tablet vessel 11.

The vessel judging section 73 has a stopper plate 82 which comes into contact with an end portion of the vessel positioning section 78 when the vessel positioning section 78 moves to the horizontal position. A plurality of diameter detecting sensors 83 are provided on the stopper plate 82 to detect the size of a tablet vessel 11 along the direction of the diameter thereof. The diameter detecting sensors 83 are disposed at predetermined distances from the point corresponding to the deepest point on the vessel positioning section 78. When a tablet vessel 11 is positioned on the vessel positioning section 78, the diameter detection sensors 83 detect the outside diameter of the tablet vessel 11.

Figure 13A:
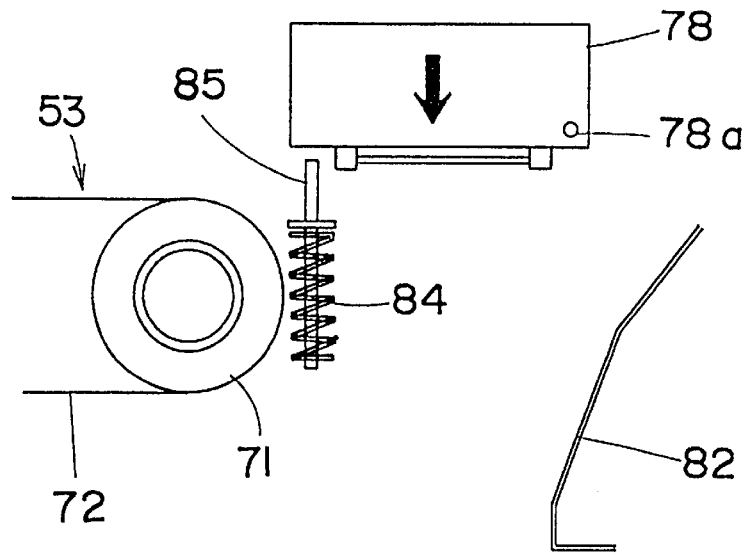
FIGS. 13A, 13B and 13C are front views illustrating the operation of a positioning section in FIG. 12.
Figure 13B:
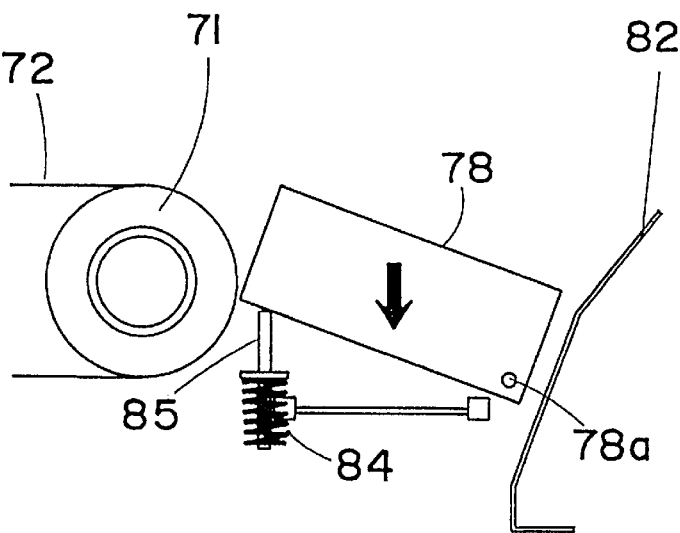
Figure 13C:
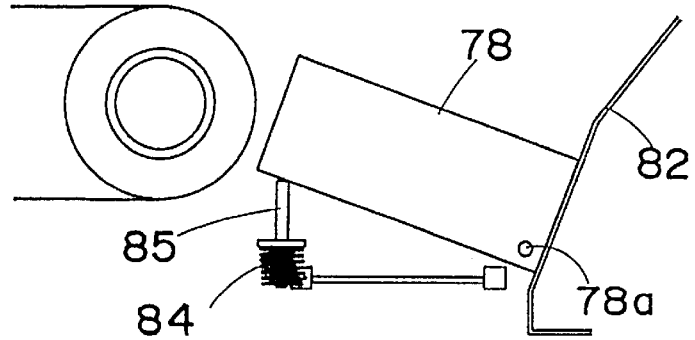

As shown in FIG. 13, a support stick 85 biased upward by a spring 84 is provided at a position opposite to the stopper plate 82. When the vessel positioning section 78 pivots to the horizontal position A, the support stick 85 comes into contact with the bottom surface of one end portion (opposite to the pivot 78a) of the section 78 to restrict the pivotal motion, whereby the vessel positioning section 78 is made as close to an end of the empty vessel conveyor 53 (the position to which a tablet vessel 11 is conveyed) as possible. That is, the approach of the vessel positioning section 78 to the empty vessel conveyor 53 brings the tip of the support stick 85 into contact with the bottom surface of the one end portion of the vessel positioning section 78 (see FIG. 13A), and a bias is thereby exerted by the spring 84. With this arrangement, there occurs a difference in the velocity of descent between the pivot 78a of the vessel positioning section 78 and the opposite side of the section 78, thereby the vessel positioning section 78 descends while pivoting about the pivot 78a (see FIG. 13B). As a result, the vessel positioning section 78 can be inclined at a position adjacent to the empty vessel conveyor 53 (see FIG. 13C).

The vessel judging section 73 has a vessel discharging section 87 for discharging the tablet vessel 11 being loaded on the vessel positioning section 78 after the vessel positioning section 78 pivots to the generally vertical position C or the vertical position B. In the vessel discharging section 87, a discharging arm 88 shaped generally like a character "L" is provided on a side rail 87 so as to be capable of reciprocating. The discharging arm 88 is provided with two discharging projections 89 such that the loaded tablet vessel 11 can be discharged whether the vessel positioning section 78 is in the generally vertical position C or in the vertical position B.

The discharging box 75 is provided in order to retrieve the tablet vessel 11 with the movement of the discharging projections 89 in the state that the vessel positioning section 78 is in the generally vertical position C.

As shown in FIG. 11, the vessel feeding section 74 comprises a cylinder 90 of which the center part is rotatably supported. When the cylinder 90 rotates to the receiving position, a first opening 90a gets ready to receive a tablet vessel 11 from the vessel judging section 73 and a second opening 90b is shut with a shutter plate 91. The cylinder 90 is rotated in forward or reverse direction to point the first opening 90a or the second opening 90b downward.

Figure 14:
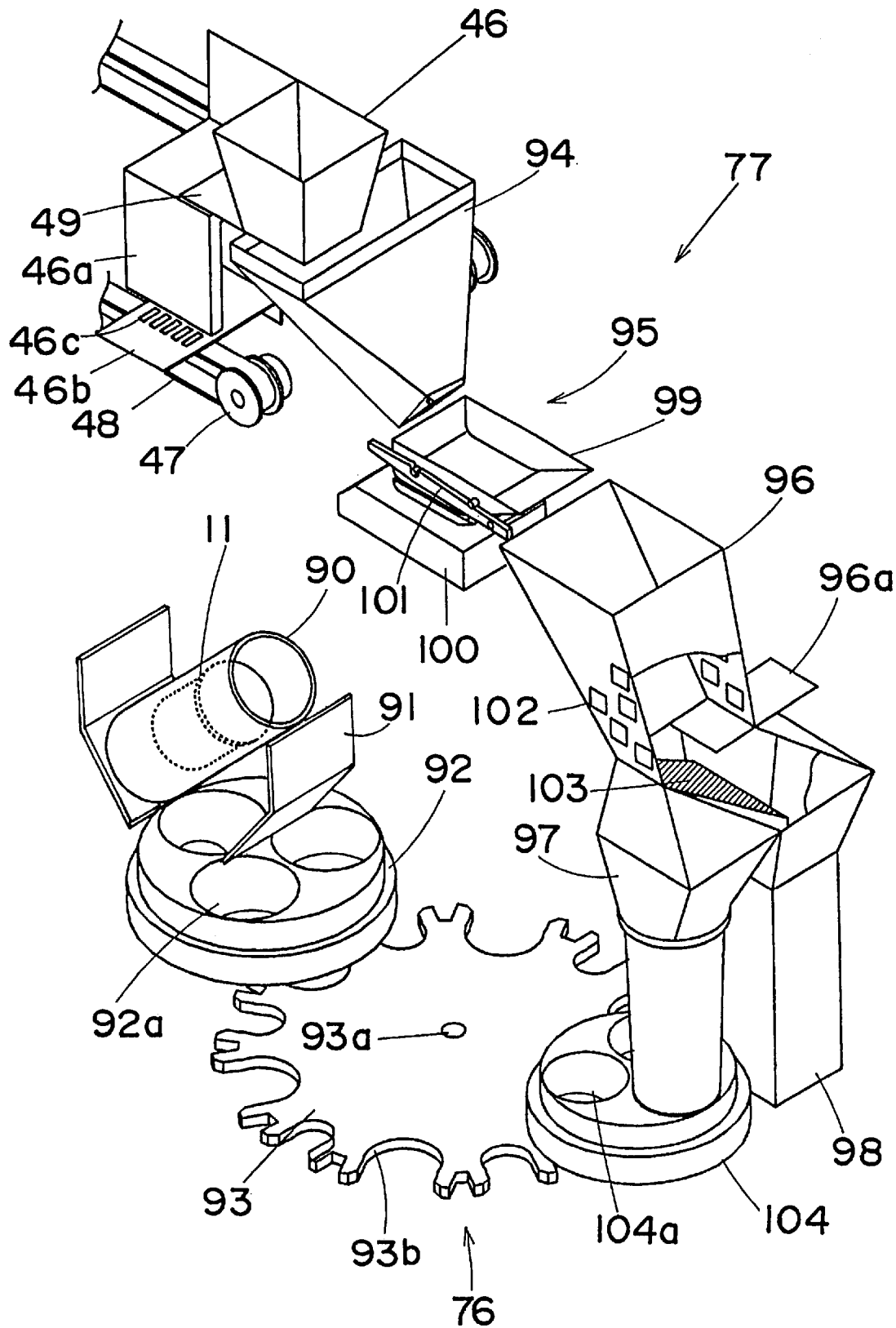
FIG. 14 is a fragmentary perspective view illustrating the vicinity of a tablet packing section in FIG. 1.
Figure 15A:
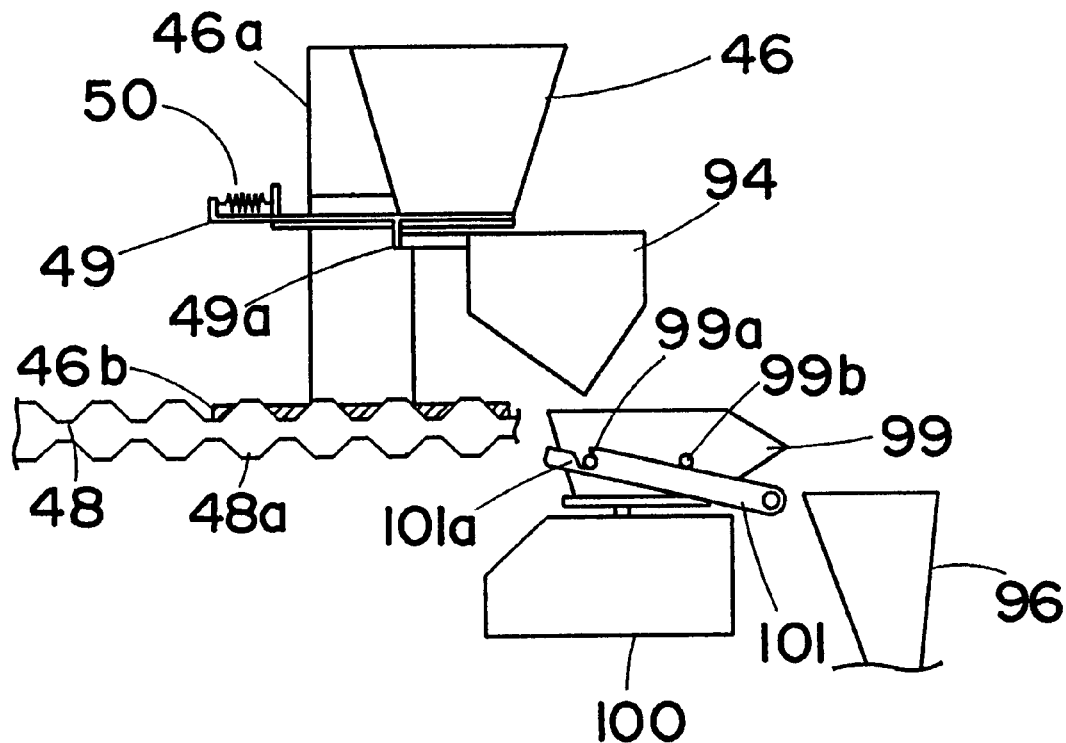
FIGS. 15A and 15B are front views illustrating the operation of a tablet weighing section in FIG. 14.
Figure 15B:
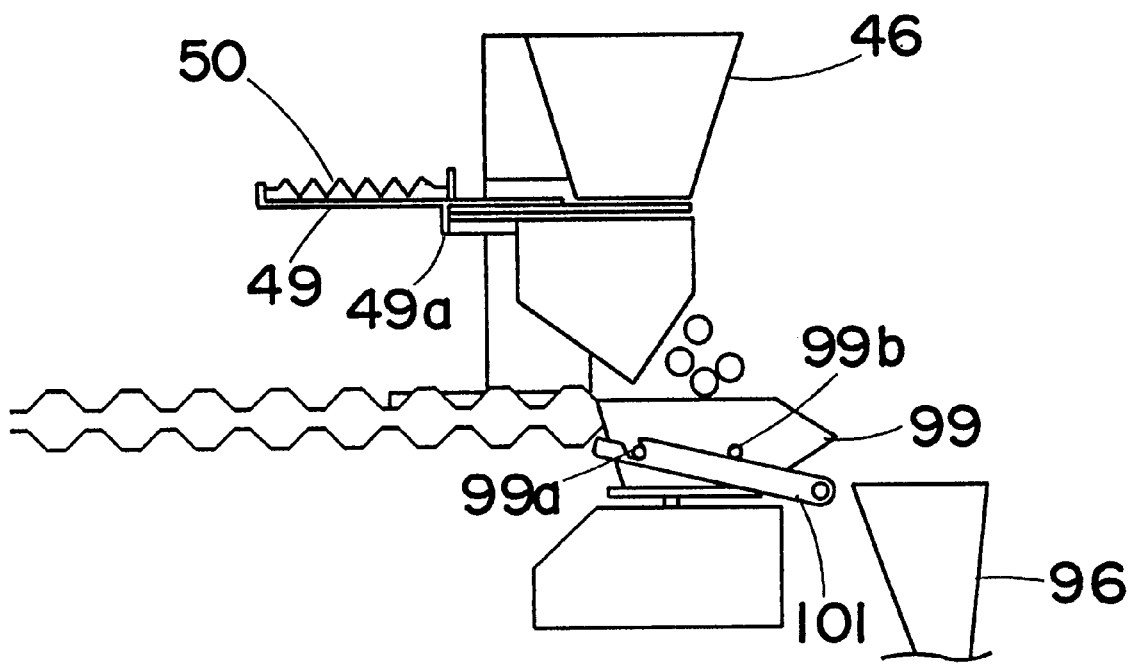

As shown in FIG. 14, a vessel guiding disc 92 is rotatably provided under the cylinder 90. Three guiding holes 92a are bored through the vessel guiding disc 92 along the circumference thereof. The upper openings of the guiding holes 92a have the same diameter, while the lower openings of the guiding holes 92a have three different diameters corresponding to the outside diameters of the vessels to be guided.

In the vessel holder section 76, vessel holder recesses 93b each shaped generally like a character "U" are formed along the outer circumference of a holder disc 93 which is rotatable about a supporting shaft 93a. The vessel holder recesses 93b are so formed as to have different widths in order to hold tablet vessels 11 having different outside diameters (In the vessel holder section 76, tablet vessels 11 of the same size cannot be held by two or more recesses).

The tablet weighing section 77 comprises an input hopper 94, a weighing section 95, a measuring hopper 96, a packing hopper 97, and a discharging hopper 98.

As shown in FIG. 15, the approach of the conveyor vessel 46 to the input hopper 94 brings the protrusion 49a of the shutter 49 into contact with an edge of the input hopper 94, causing the shutter 49 to open against the bias exerted by the spring 50. This operation allows the tablets accommodated in the conveyor vessel 46 to fall into the input hopper 94.

Figure 16A:
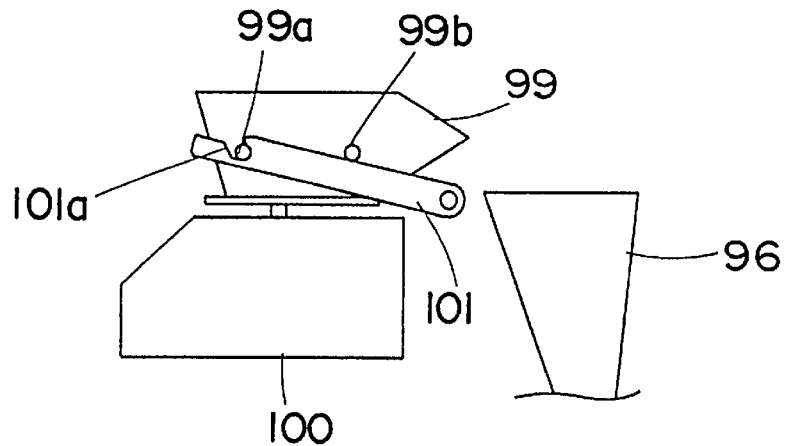
FIGS. 16A, 16B and 16C are front views illustrating the operation of the tablet weighing section in FIG. 14.
Figure 16B:
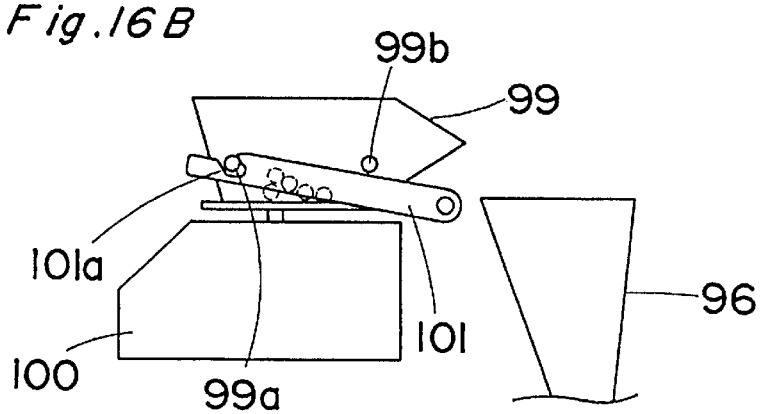
Figure 16C:
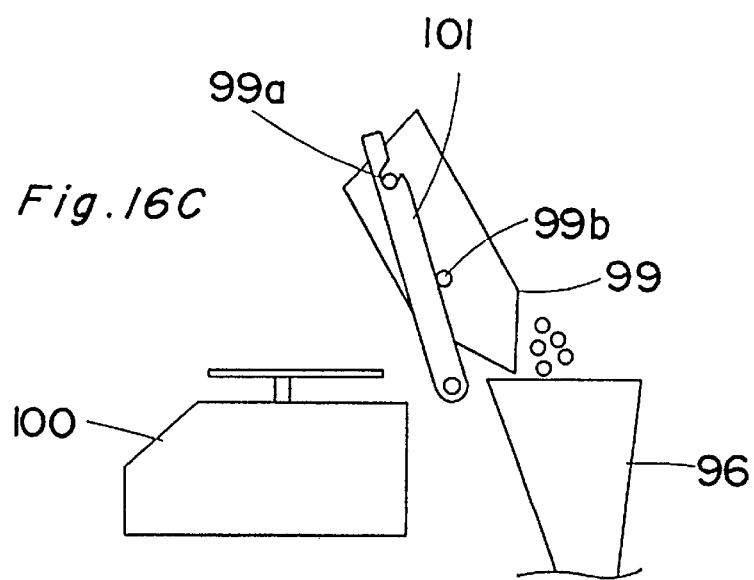

As shown in FIGS. 14 and 15, the weighing section 95 comprises a weighing vessel 99 for accommodating tablets which have fallen from the input hopper 94, a weighing device 100 for weighing the weighing vessel 99 along with the accommodated tablets, and a pair of arms 101 for supporting the weighing vessel 99. Two projections 99a, 99b, as shown in FIG. 16A, are formed on each outside surface on both sides of the weighing vessel 99. At the distal end of each arm 101 is formed an engaging recess 101a which engages with the projection 99a at one end. The engaging recess 101a is so shaped that the projections 99a on the weighing vessel 99 are prevented from falling out when tablets in the weighing vessel 99 are fed into the packing hopper 97 with the pivotal motion of the arms 101. When tablets are fed from the input hopper 94 into the weighing vessel 99, the arms 101 suspend the weighing vessel 99 above the weighing device 100 so that the impulsive force caused by the feeding cannot act directly on the weighing device 100. After the feeding, the arms 101 pivot to load the weighing vessel 99 on the weighing device 100. With this arrangement, the measuring time by the weighing device 100 is shortened.

The bottom surface of the measuring hopper 96 comprises a shutter 96a as shown in FIG. 14. Packing amount detecting sensors 102 are provided on the side surfaces facing each other of the measuring hopper 96, so that the amount of the tablets stocked in the measuring hopper 96 can be determined.

The upper openings of the packing hopper 97 and of the discharging hopper 98 are closed and opened by a closing/opening door 103 provided pivotably. An input guiding disc 104 is rotatably disposed under the packing hopper 97. Three tablet guiding holes 104a are bored through the input guiding disc 104 along the circumference thereof. The inside diameter of the upper end of each tablet guiding hole 104a is generally as large as the inside diameter of the packing hopper 97, while the inside diameter of the lower end of each tablet guiding hole 104a is generally as large as the inside diameter of the upper end of each tablet vessel 11 which is to be provided under the tablet guiding hole 104a. That is, the upper ends of the tablet guiding holes 104a have the same inside diameters, while the lower ends of the tablet guiding holes 104a have three different inside diameters corresponding to the sizes of the tablet vessels 11. The inside surfaces of the tablet guiding holes 104a are smoothly tapered between the openings of the upper and lower ends of the holes.

Figure 17:
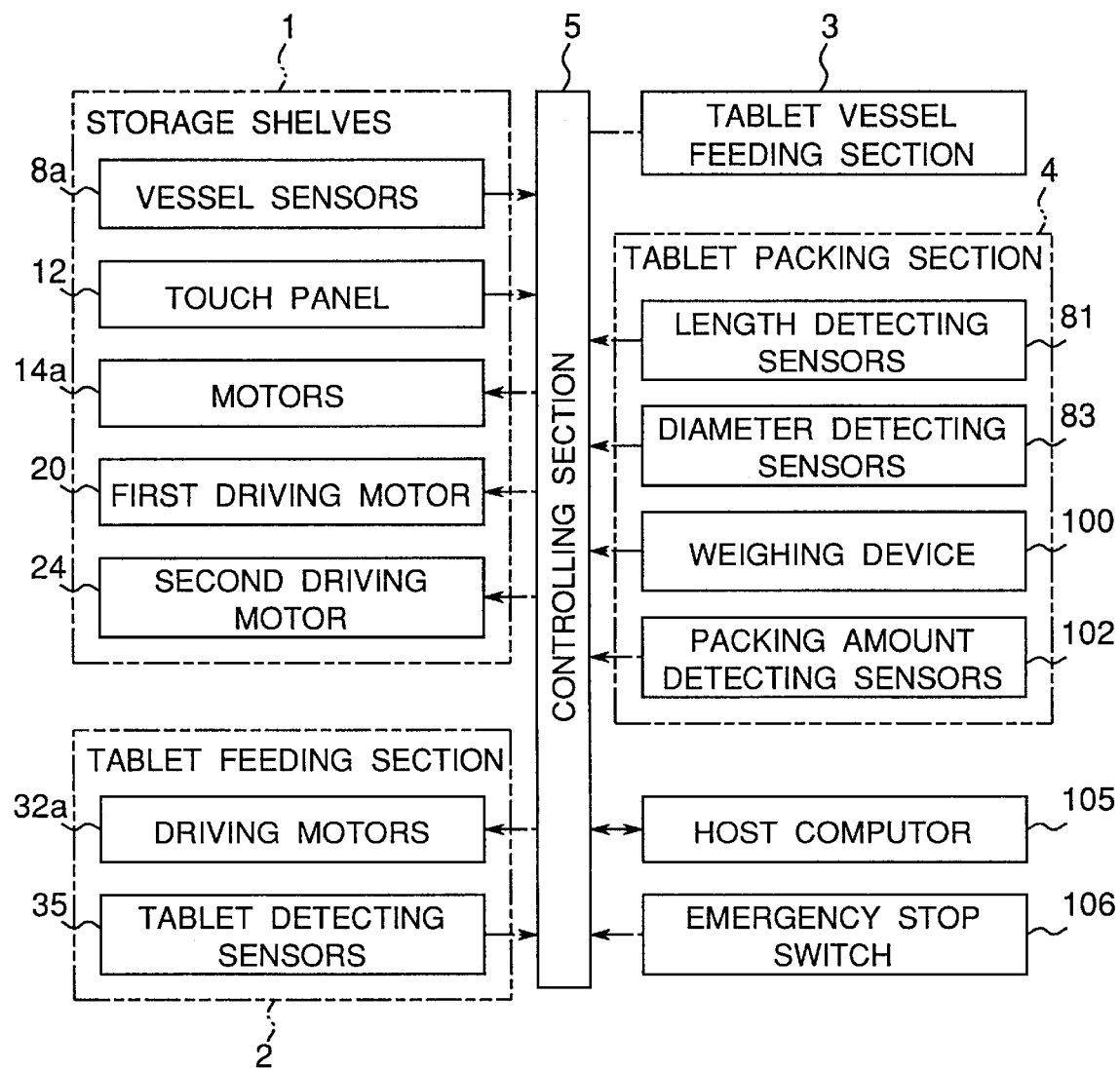
FIG. 17 is a block diagram on the tablet packing apparatus in accordance with the invention.

As shown in FIG. 17, the controlling section 5 receives an input of prescription data from a host computer 105 (or only an input signal from the touch panel 12). The controlling section 5 also receives a signal from or actuates and controls the storage shelves 1 (e.g., the vessel sensors 8a, the touch panel 12, motors 14a, the first driving motor 20, and the third driving motor 24), the tablet feeding section 2 (e.g., the driving motors 32a, and the tablet detecting sensors 35), the tablet vessel feeding sections 3, and the tablet packing section 4 (e.g., the length detecting sensors 81, the diameter detecting sensors 83, the weighing device 100, the packing amount detecting sensors 102) and an emergency stop switch 106 and so on.

The operation of the tablet packing apparatus arranged as above will be described below.

Figure 18:
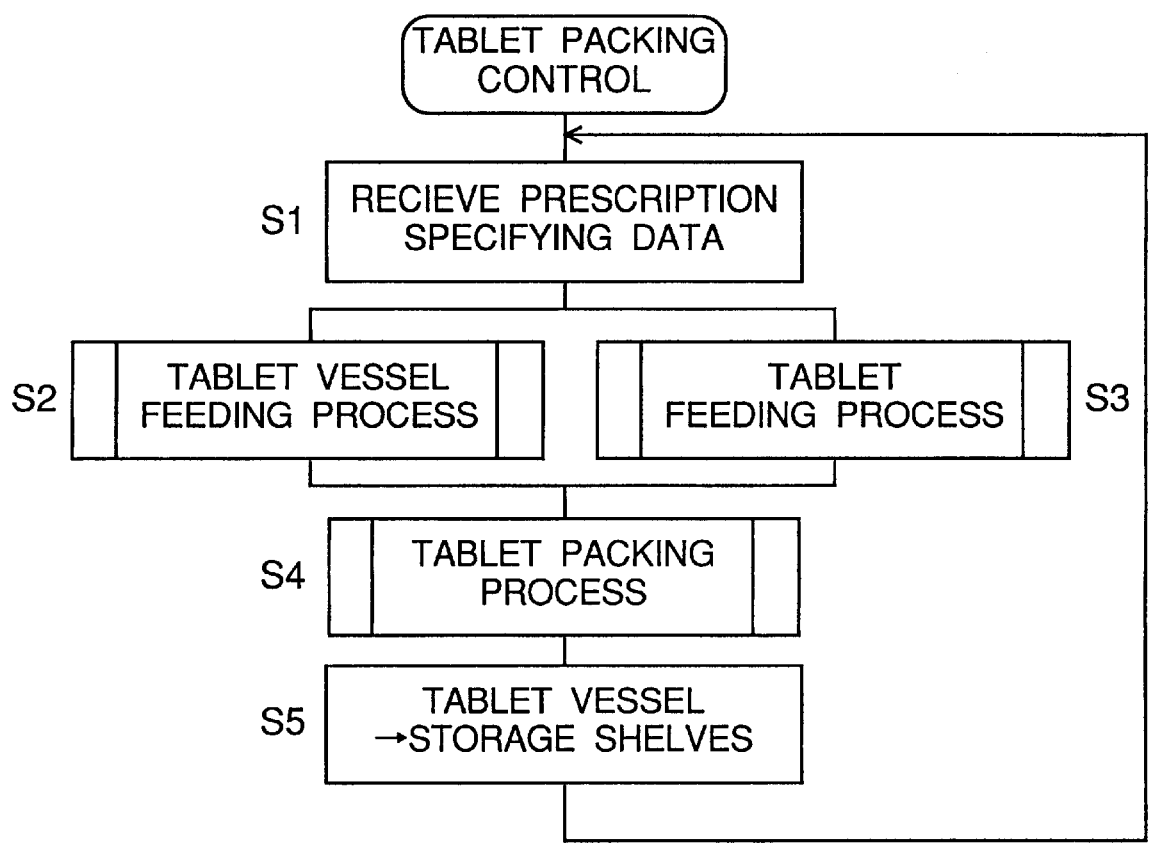
FIG. 18 is a main flow chart illustrating the tablet packing control.

As shown in the flow chart of FIG. 18, first, prescription specifying data based on prescription data is received from the host computer 105 (step S1). A empty tablet vessel feeding process (step S2) and a tablet feeding process (step S3) are then performed simultaneously in parallel on the basis of the prescription specifying data. Subsequently, a tablet packing process (step S4) is performed, and a vessel delivering process (step S5) is then performed for delivering the tablet vessel 11 to the container chamber 6 in the storage shelves 1. The prescription specifying data may be received in multiple according to the processing capacity.

Figure 10A:
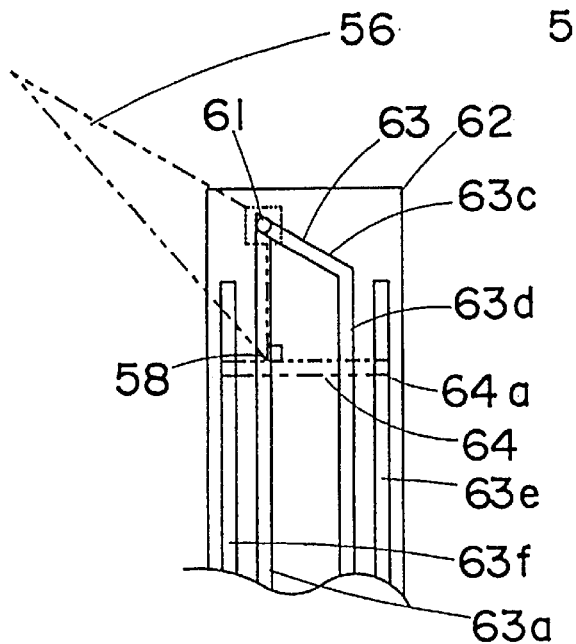
FIGS. 10A, 10B, 10C, 10D, 10E, and 10F are fragmentary front views illustrating the operation of the lifting member in FIG. 8.
Figure 10B:
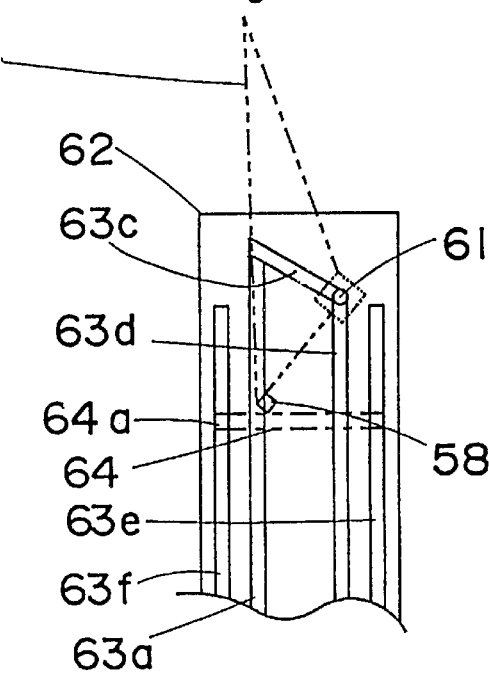
Figure 10C:
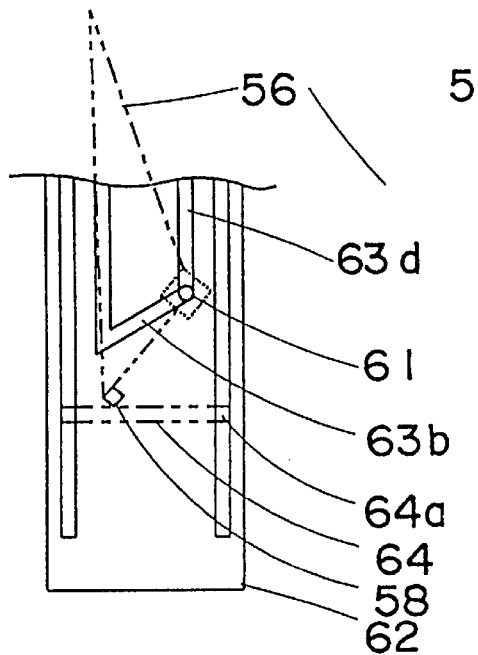
Figure 10D:
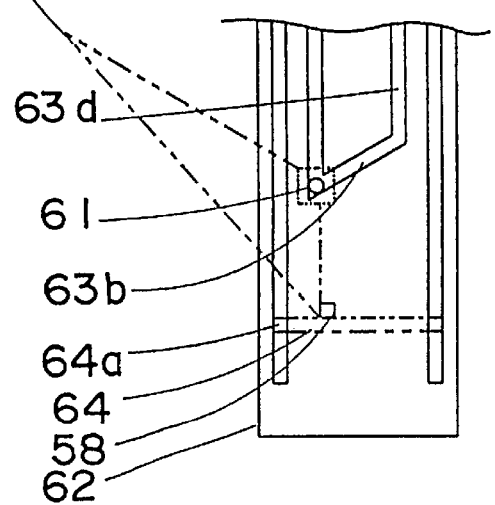
Figure 10E:
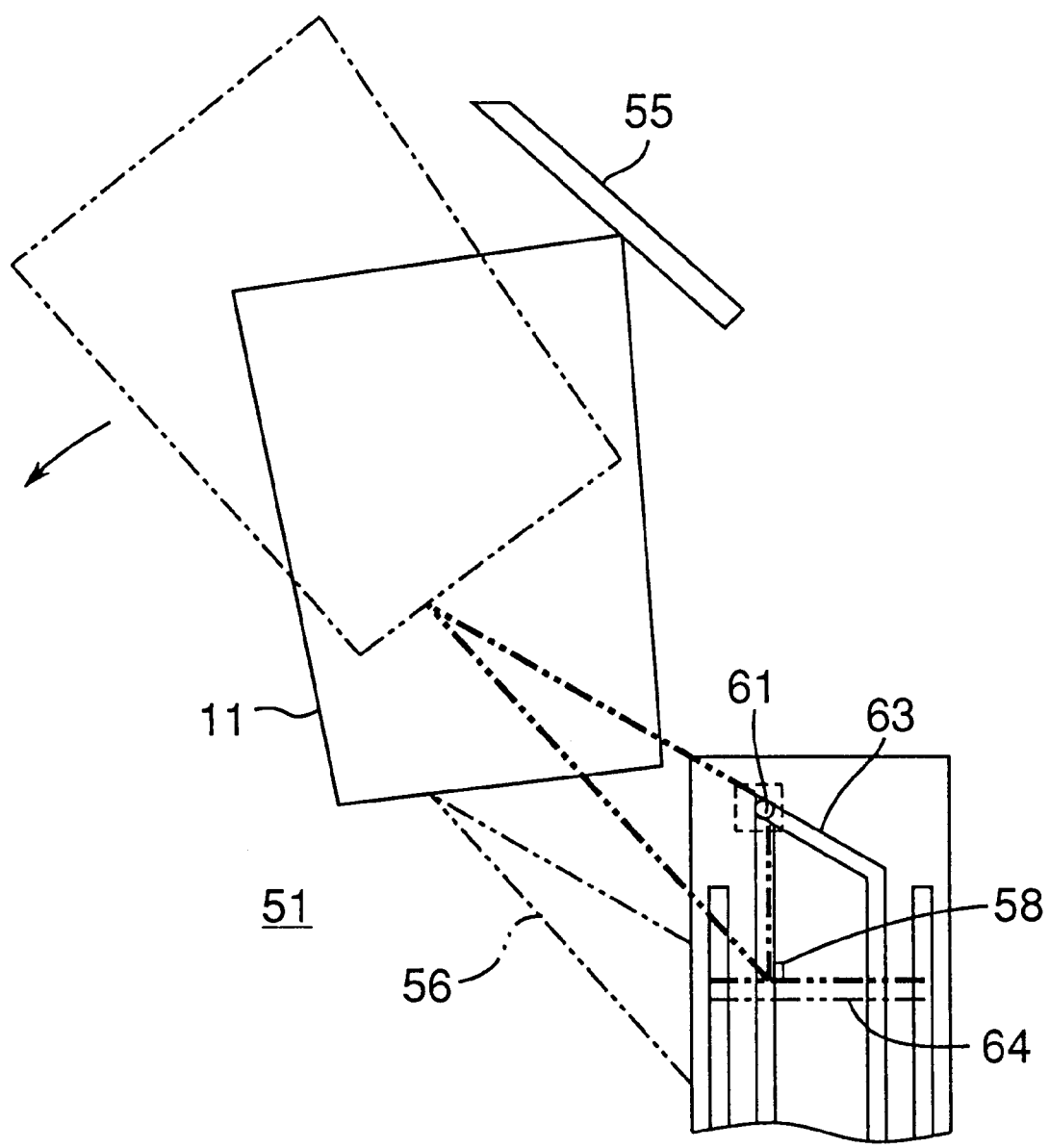
Figure 10F:
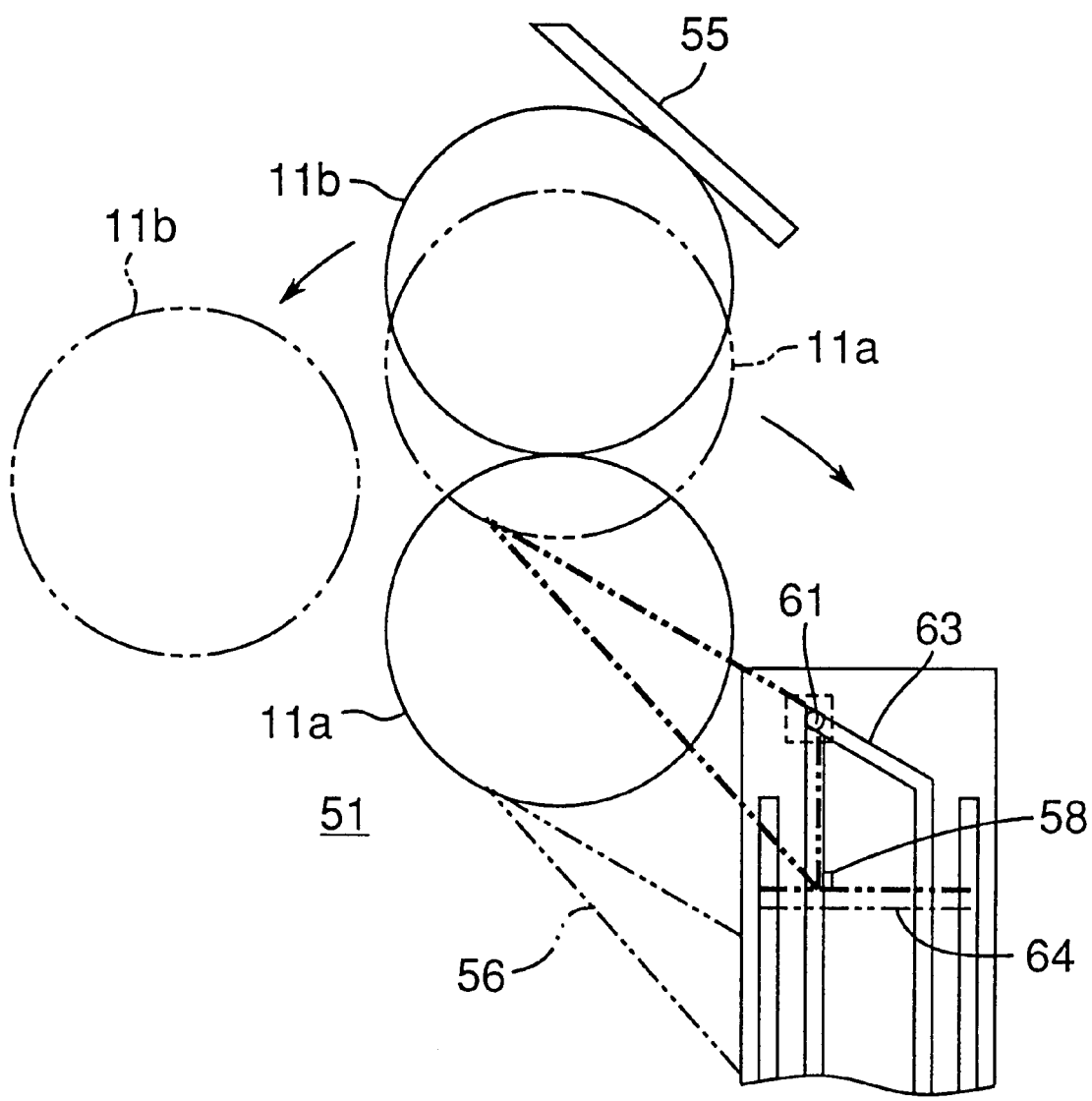
Figure 19:
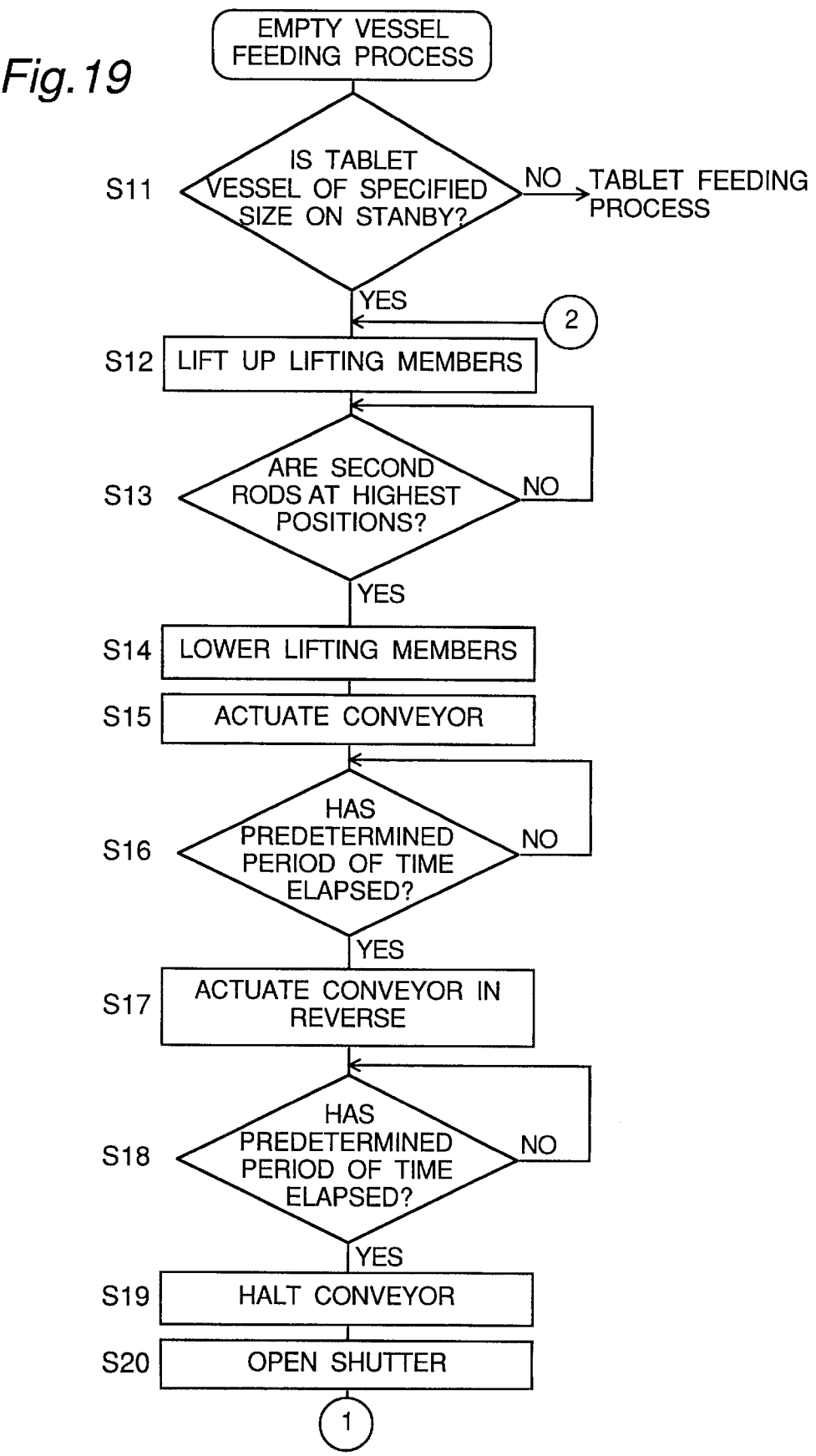
FIG. 19 is a flow chart illustrating an empty vessel feeding process in FIG. 18.
Figure 20:
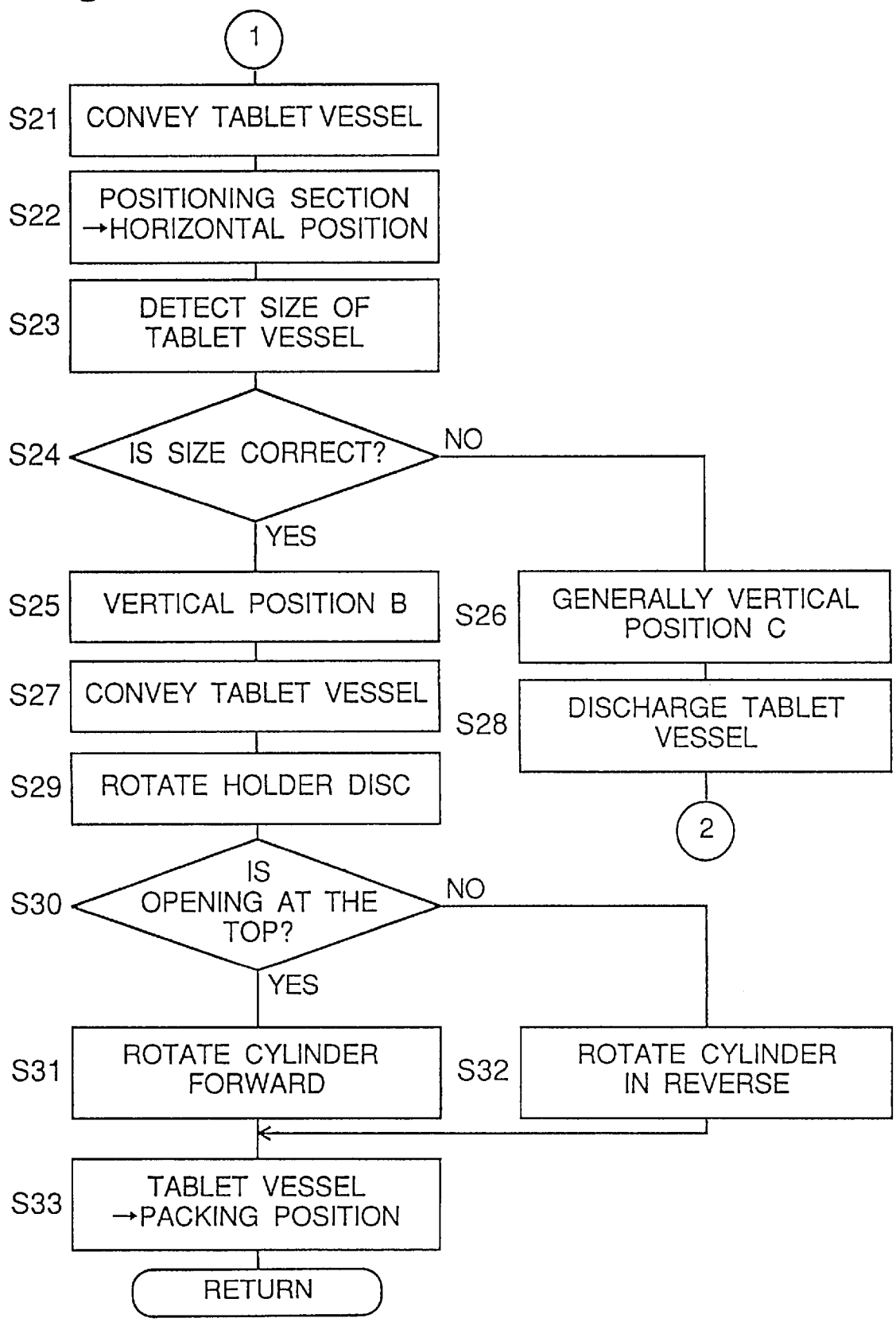
FIG. 20 is a flow chart continued from FIG. 18.

In the empty vessel feeding process, as shown in the flow charts of FIGS. 19 and 20, it is first judged whether a tablet vessel 11 of a specified size is on standby in the tablet packing section 4 or not (step S11). In the case that the vessel 11 is on standby, the tablet feeding process (as described below) is initiated. In the case that the vessel 11 is not on standby, the vessel takeout section 52 for a relevant stock container 51 is actuated to lift up the lifting members 56 (step S12). Typically, a tablet vessel 11 pointing in the lateral direction is loaded on the lifting members 56. However, in the case that a tablet vessel 11 pointing in the vertical direction is loaded as shown in FIG. 10E or that two tablet vessels 11 are stacked in the lateral direction as shown in FIG. 10F, the tablet vessel 11 or 11b are brought into contact with the tilting member (vessel removing means) 55 during the lift of the lifting members 56, and are returned into the stock container 51. While the lifting members 56 are lifted up, the second rods 61 are also lifted up in the vertical inside grooves 63a. Once the second rods 61 move up to the highest positions and protrude into the slanting top grooves 63c with the biases exerted by the springs 60, as shown in FIG. 10A (step S13), the lifting members 56 are lowered (step S14). When the second rods 61 move in the slanting top grooves 63c, the lifting members 56 pivot about the first rod 58, as shown in FIG. 10B, to feed the conveyor 66 with only one tablet vessel 11 pointing in the lateral direction which has been loaded on the lifting members 56. While the second rods 61 move in the vertical outside grooves 63d after the feed of the tablet vessel 11 to the conveyor 66, the lifting members 56 which have pivoted toward the outer sides of the side walls 51a are lowered while keeping the position as shown in FIG. 10C. While the second rods 61 move in the slanting lower grooves 63b, the lifting members 56 gradually pivot to protrude toward the stock container 51, thus returning to their initial lower positions as shown in FIG. 10D.

The conveyance by the conveyor 66 is then initiated (in step S15) to transport to the vessel conveyance standby chamber 67 the tablet vessel 11 which has been loaded on the conveyor ropes 69 through the bent portion 51b. The motor for the conveyor 66 is actuated in reverse direction after the elapse of a predetermined period of time so that the next tablet vessel 11 cannot be present above the vessel conveyance standby chamber 67 in which one tablet vessel 11 has been accommodated (steps S16 to S19).

When the transportation of the tablet vessel 11 to the vessel conveyance standby chamber 67 is thus completed, the shutter 70 is opened (in step S20) to allow the tablet vessel 11 to be loaded on the conveyor ropes 72 of the empty vessel conveyor 53. Once the tablet vessel 11 is dispensed from the stock container 51, a motor for the empty vessel conveyor 53 is driven to convey the tablet vessel 11 to the tablet packing section 4 with the conveyor ropes 72 (step S21).

In the tablet packing section 4, the vessel positioning section 78 is caused to pivot to the horizontal position A and is inclined so as to point diagonally downward relative to the empty vessel conveyor 53 (step S22). In the inclined position, as described above, the vessel positioning section 78 can be set close to the conveyor ropes 72, and therefore the conveyed tablet vessel 11 can be smoothly positioned onto the vessel positioning section 78.

Subsequently, the size of the tablet vessel 11 is detected by the length detecting sensors 81 and the diameter detecting sensors 83 (step S23), and it is judged whether the size is as large as the specified size or not (step S24). When it is judged that the tablet vessel 11 has the specified size, the vessel positioning section 78 is caused to pivot to the vertical position B (step S25). When it is judged that the tablet vessel 11 does not have the specified size, the pivotal motion of the vessel positioning section 78 is halted at the generally vertical position C preceding the vertical position (step S26). With the movement of the discharging arm 88 of the vessel discharging section 87, the tablet vessel 11 in the vertical position B is conveyed into the cylinder 90 in the vessel feeding section 74 by the discharging members 89 (step S27), or the tablet vessel 11 in the generally vertical position C is discharged into the discharging box 75 by the discharging members 89 (step S28).

In the vessel holder section 76, the holder disc 93 is rotated on the basis of detection signals from the diameter detecting sensors 83 and the length detecting sensors 81 in the vessel judging section 73 to set in position the vessel holder section 76 corresponding to the determined size of the vessel (step S29). With this step, the tablet vessel 11 is held by the corresponding vessel holder section 76 on the holder disc 93 after falling through a guiding hole 92a in the vessel guiding disc 92.

In the vessel feeding section 74, the orientation is determined of the bottom surface (or the opening) of the tablet vessel 11 which has been fed on the basis of detection signals from the diameter detecting sensors 83 of the vessel judging section 73 (step S30). The cylinder 90 is then set upright as follows: in the case that the tablet vessel 11 has been brought with the bottom surface ahead, the cylinder 90 is rotated clockwise, i.e., in forward direction (step S31); in the case that the tablet vessel 11 has been brought with the opening ahead, the cylinder 90 is rotated counterclockwise, i.e., in reverse direction (step S32).

When the positioning of the tablet vessel 11 into the vessel holder section 76 is thus completed, the holder disc 93 is rotated to move the tablet vessel 11 to the packing position (step S33). The input guiding disc 104 is rotated to set in position the tablet guiding hole 104a of which the inside diameter is suited to the inside diameter of the tablet vessel 11 conveyed to the packing position.

Figure 21:
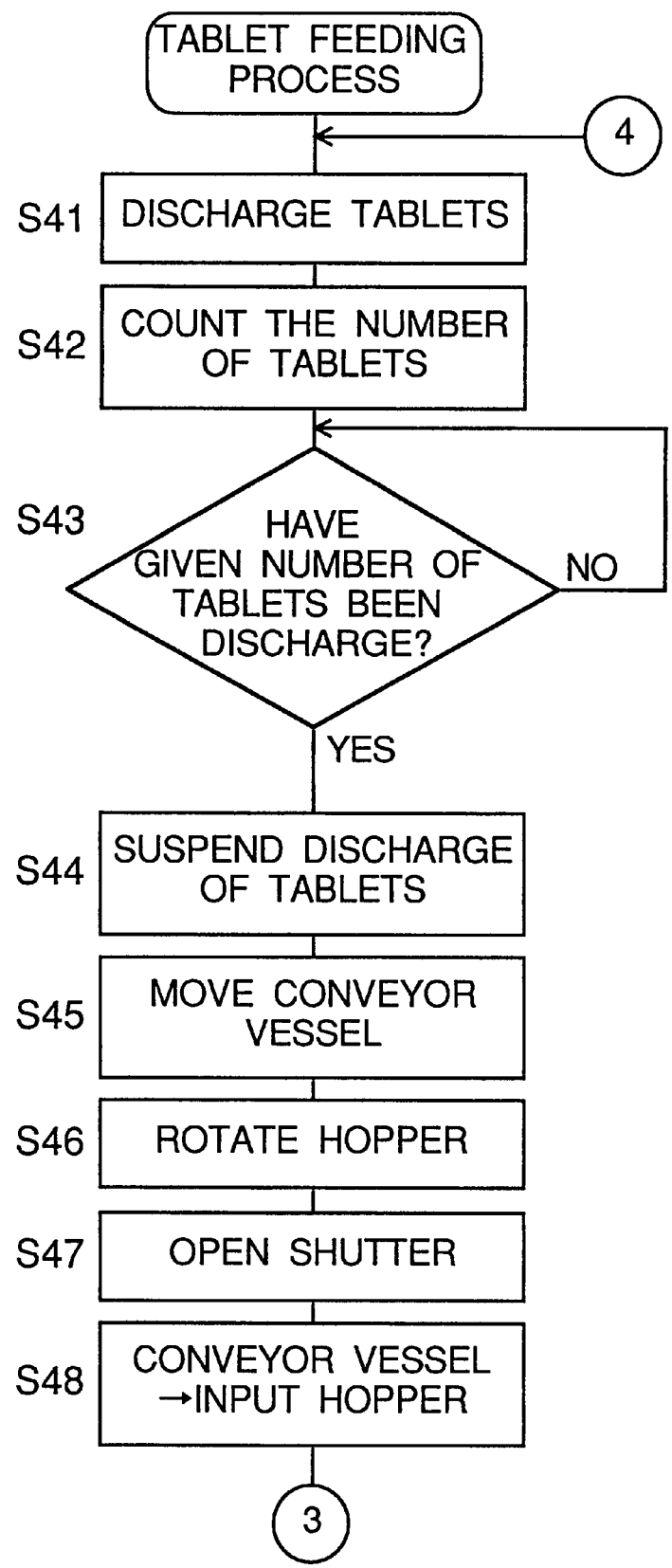
FIG. 21 is a flow chart illustrating a tablet feeding process in FIG. 18.
Figure 22:
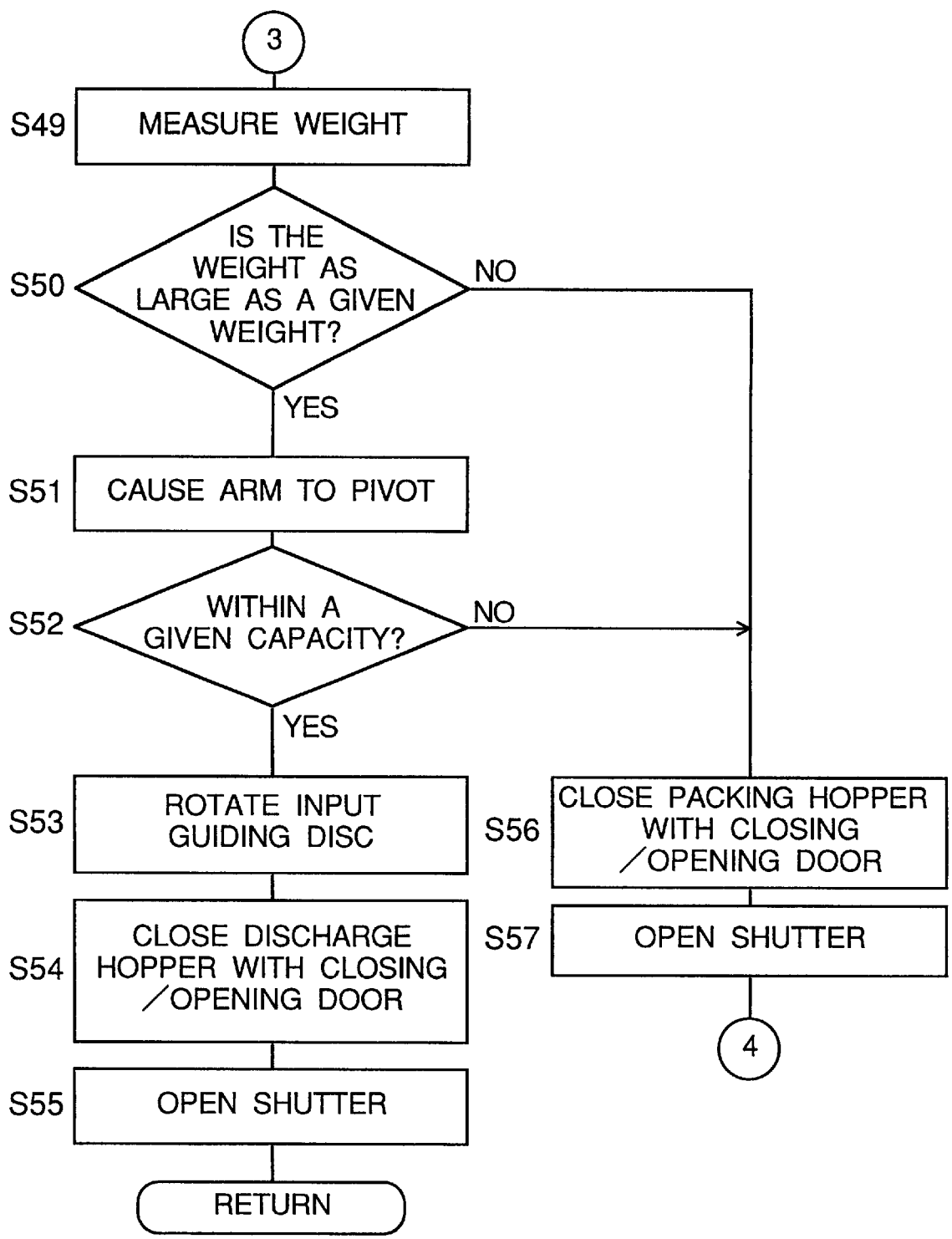
FIG. 22 is a flow chart continued from FIG. 21.

In the tablet feeding process, as shown in the flow chart of FIGS. 21 and 22, a relevant tablet container section 26 is actuated and controlled on the basis of the prescription specifying data. That is, the built-in motor in the relevant motor base 32 is driven to rotate the rotor 39 to discharge a given number of the tablets stored in the feeder vessel 36 (step S41). The number of the discharged tablets is counted by the tablet detecting sensor 35 provided in the fall guide path 34 (step S42). After the given number of tablets are discharged from the feeder vessel 36 through the fall guide path 34 into a common guide path 31 (step S43), the rotation of the rotor 39 is halted to suspend the discharge of tablets (step S44).

The tablet conveyor section 27 is then actuated and controlled; that is, the pulleys 47 are driven and rotated so that the conveyor vessel 46 is moved by the conveyor belt 48 and positioned under the common guide path 31 (step S45). The hopper 44 is then rotated to direct the opening thereof to the conveyor vessel 46 (step S46), and the valve 44b is opened to allow the tablets to be stored into the conveyor vessel 46 (step S47).

After the given number of the relevant tablets are stored in the conveyor vessel 46, the conveyor vessel 46 is moved to the input hopper 94 by the actuation and control of the tablet conveyor section 27 (step S48). At this time, the protrusion 49a of the shutter 49 comes into contact with an edge of the input hopper 94, and the movement of the conveyor vessel 46 thereby causes the shutter 49 to open gradually, so that the stored tablets are inputted into the weighing vessel 99 through the input hopper 94. The weighing vessel 99 is then suspended slightly above the weighing device 100 by the pivotal motion of the arms 101, so that the impulsive force caused by the input of the tablets cannot act directly on the weighing device 100. Subsequently, the weighing vessel 99 is loaded on the weighing device 100 by the pivotal motion of the arms 101 and the weight of the weighing vessel 99 is measured (step S49).

It is then judged whether the weight is as large as a given weight or not (step S50). The tablets are then fed into the measuring hopper 96 by the pivotal motion of the arms 101 (step S51). Whether the amount of the tablets is within the capacity of the tablet vessel 11 or not is then judged on the basis of detection signals from the packing amount detecting sensors 102 in the measuring hopper 96 (step S52).

In the case that the weight is as large as the given value and that the amount of the fed tablets is not more than the given amount, it is judged that the relevant tablets could be packed by the given amount. The input guiding disc 104 is rotated to set in position the tablet guiding hole 104a of which the inside diameter of the lower end opening is as large as the inside diameter of the tablet vessel 11 provided under the guiding hole 104a (step S53). Subsequently, the opening of the discharging hopper 98 is closed by the closing/opening door 103 (step S54), and the shutter 96a is opened (step S55). The tablets are thus packed into the tablet vessel 11 through the tablet hopper 97.

In the case that the weight is larger or smaller than the given value or that the amount of the fed tablets is larger than the given amount, it is judged that the tablets are irrelevant or that the amount of the tablets exceeds the capacity of the tablet vessel 11. The opening of the packing hopper 97 is then closed (step S56), and the shutter 96a is opened (step S56). The tablets are thus discharged through the discharging hopper 98. In this case, the tablet feeding process is performed afresh.

Figure 23:
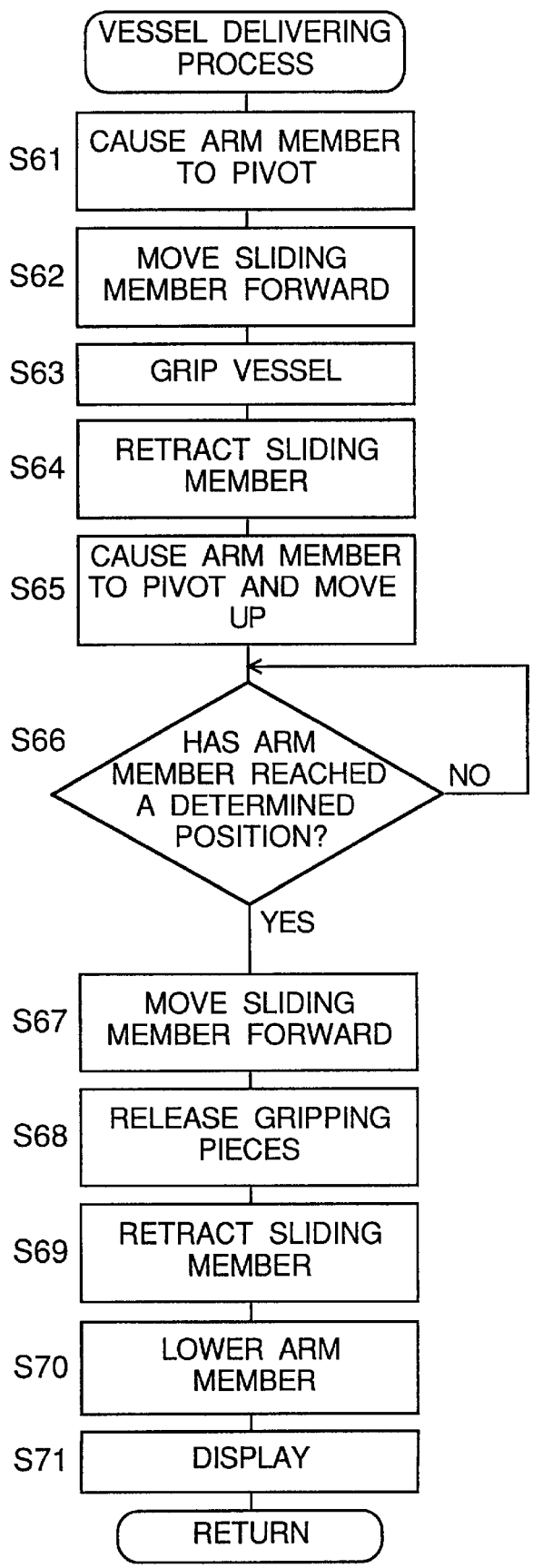
FIG. 23 is a flow chart illustrating a vessel delivering process in FIG. 18.

After the tablets are packed into the tablet vessel 11, the process for delivering the vessel to the storage shelves 1 is performed. In the delivering process, as shown in FIG. 23, the arm member 15 is caused to pivot (step S61), the sliding member 22 is moved forward relative to the arm body 19 (step S62), and the tablet vessel 11 is gripped by the gripping pieces 25 (step S63). The sliding member 22 is then retracted (step S64), and the arm member 15 is caused to pivot and elevated (step S65). The position where the arm member 15 is to reach with the pivotal motion and elevation is determined as follows: the container chambers 6 are numbered so that the number increases with decrease in the easiness for an operator to take out a tablet vessel 11 from the container chamber 6, and the position is so determined as to allow the storage into the vacant container chamber 6 which has the smallest number.

Once the arm member 15 reaches the determined position to reach with the pivotal motion and elevation (step S66), the sliding member 22 is moved forward to deliver the gripped tablet vessel 11 to the container chamber 6 in the storage shelves 1 (step S67). The tablet vessel 11 then travels to the recesses 10a while pushing aside the holding plates 9 in the container chamber 6 through the medium of the cutouts 10b formed in the holding lugs 10, and is held with the bias exerted by the spring 9a. The gripping pieces 25 are then released (step S68); the sliding member 22 is retracted (step S69); and the arm member 15 is subsequently lowered (step S70) for the delivery of the next tablet vessel 11.

In the selection of the aimed container chamber 6, the container chambers 6 may be numbered so that the number increases with increase in the period of time required for the delivery of a tablet vessel 11 to the container chamber 6 by the arm member 15, and the vacant container chamber 6 which has the smallest number may be selected as the aimed chamber.

Once the tablet vessel 11 packed with the given amount of the specified tablets is thus delivered to the container chamber 6 in the storage shelves 1, the numbers assigned to the feeder vessels and the counts of the tablets are displayed on the display 7 of the relevant container chamber 6 in response to a detection signal from the vessel sensor 8a (step S71).

The stock container 51 may be configured as follows.

Figure 24:
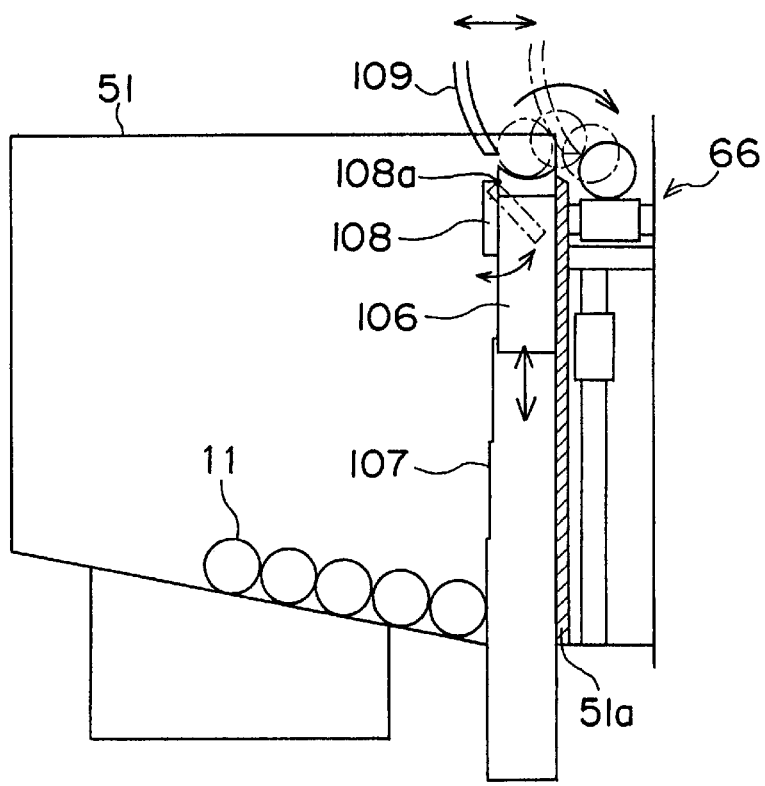
FIG. 24 is a sectional view illustrating a stock container in accordance with another embodiment.

As shown in FIG. 24, a vessel support base 106 which can be moved vertically is provided on the inside surface of a side wall 51a of the stock container 51. The vessel support base 106 has a multistage shutter 107 on the inside thereof. The shutter 107 expands and contracts with the vertical motion of the vessel support base 106 to prevent tablet vessels 11 from intruding under the vessel support base 106. A tilting member 108 which is pivotable about a pivot 108a is provided above the vessel support base 106. The tilting member 108 is tilted, as shown in the chain lines in the drawing, to return extra tablet vessel(s) 11 into the stock container 51 in the same manner as the tilting member 55. When the state is achieved where only one tablet vessel 11 in the lateral position is loaded on the vessel support base 106, the tilting member 108 returns to the position shown in solid lines in the drawing so as not to prevent the motion of the vessel support base 106. Above the tilting member 108 is provided a discharging member 109, which discharges aside the elevated tablet vessel 11. The conveyor 66 and the vessel conveyance standby chamber 67 have the same configurations as the embodiment described previously.

Figures 25A, 25B:
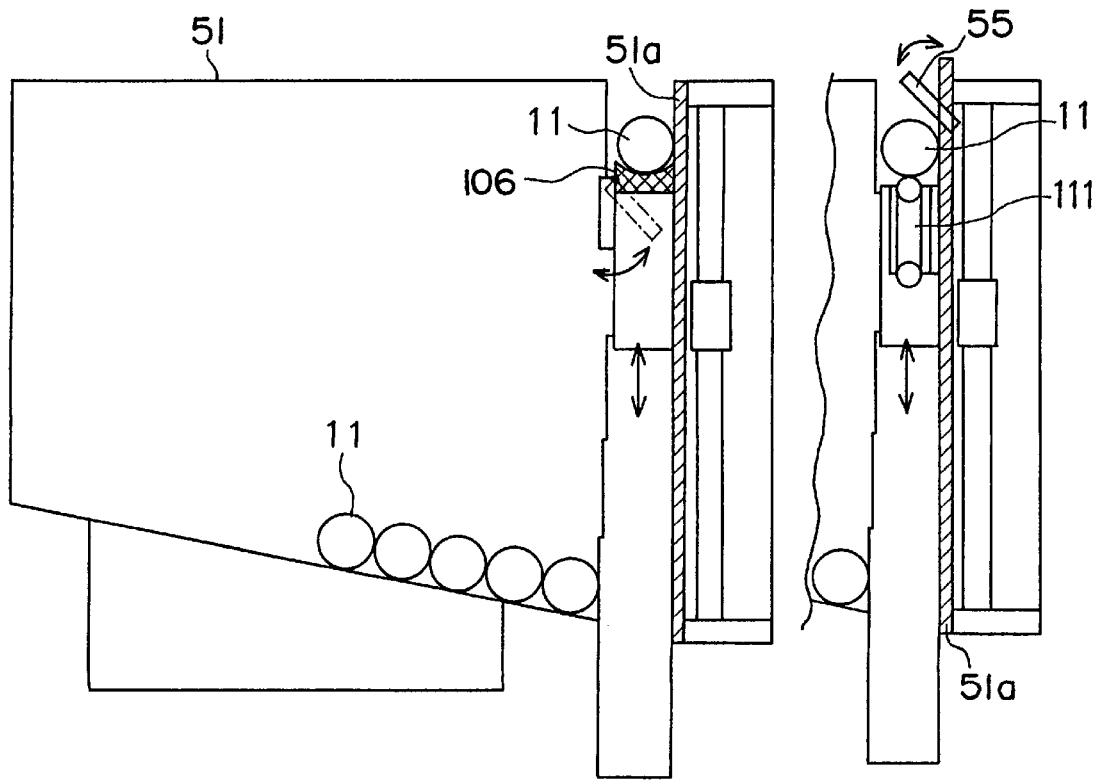
FIGS. 25A and 25B are sectional views illustrating stock containers in accordance with another embodiments.
Figure 26A:
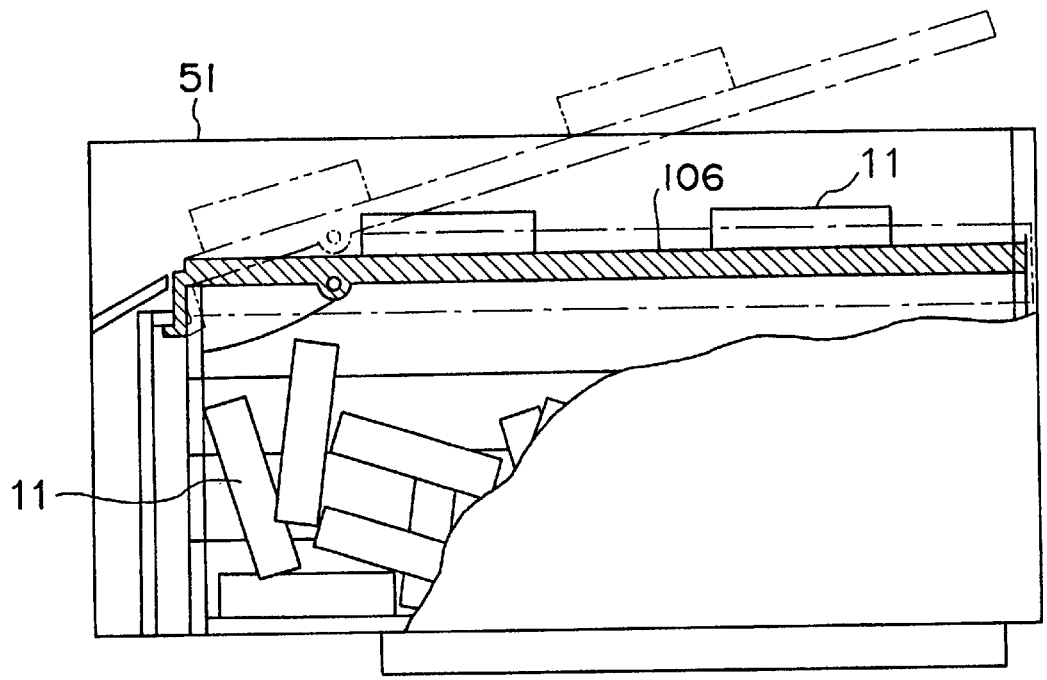
FIGS. 26A and 26B are front views illustrating the stock container in FIGS. 25A and 25B.
Figure 26B:
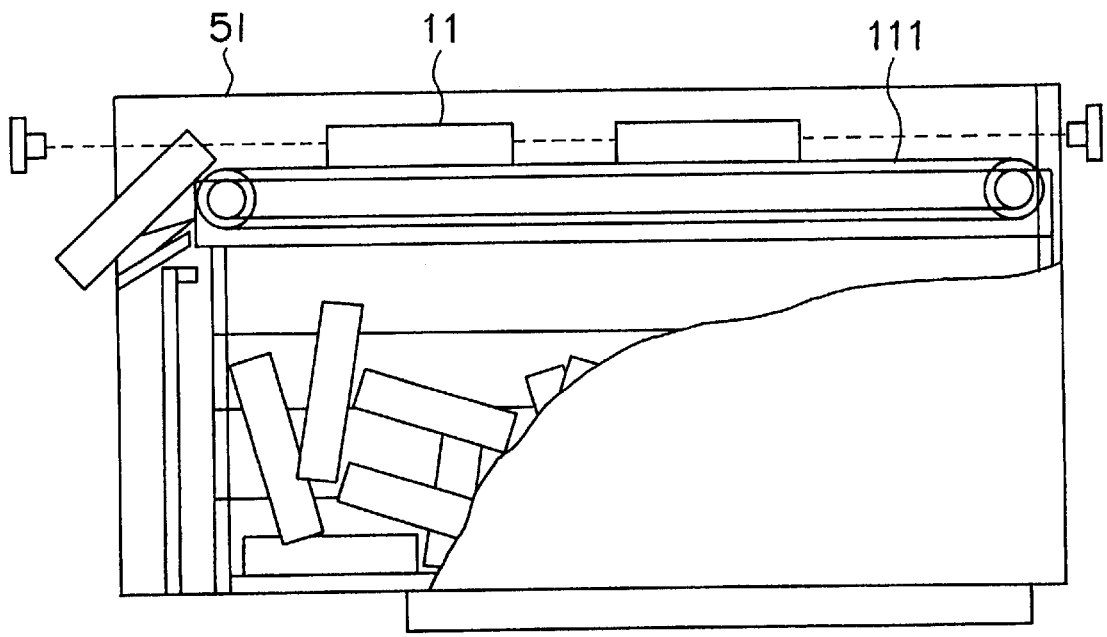

Instead of providing the conveyor 66 and the vessel conveyance standby chamber 67, the vessel support base 106 may be pivotably configured as shown in FIGS. 25A and 26A, or a conveyor belt 111 may be provided instead of the vessel support base 106 as shown in FIGS. 25B and 26B.

The tilting member 55 or 108 may be configured as follows.

Figure 27A:
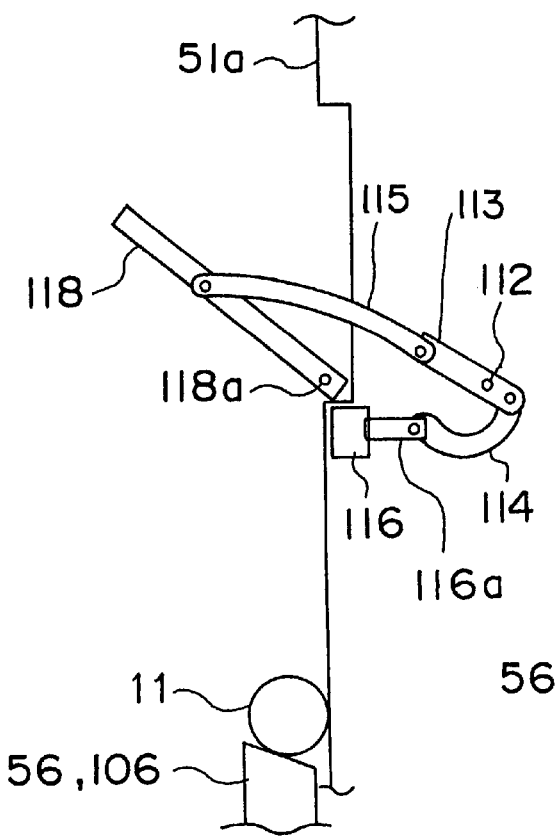
FIGS. 27A, 27B and 27C are schematic representations illustrating a tilting member in accordance with another embodiment.
Figure 27B:
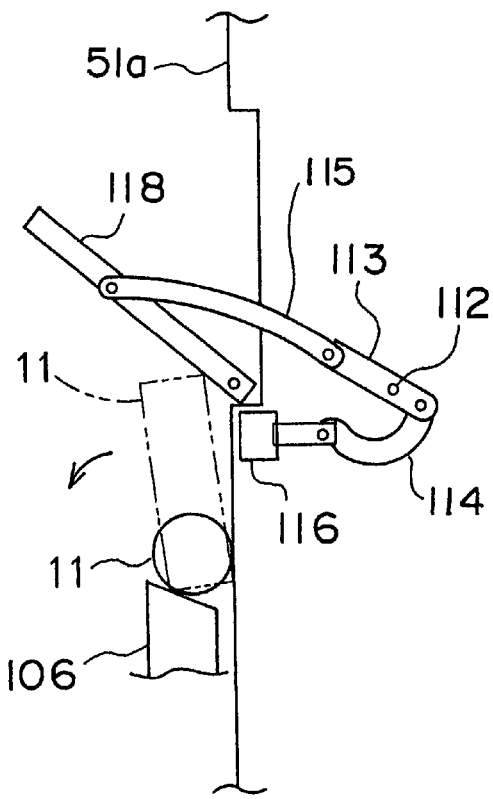
Figure 27C:
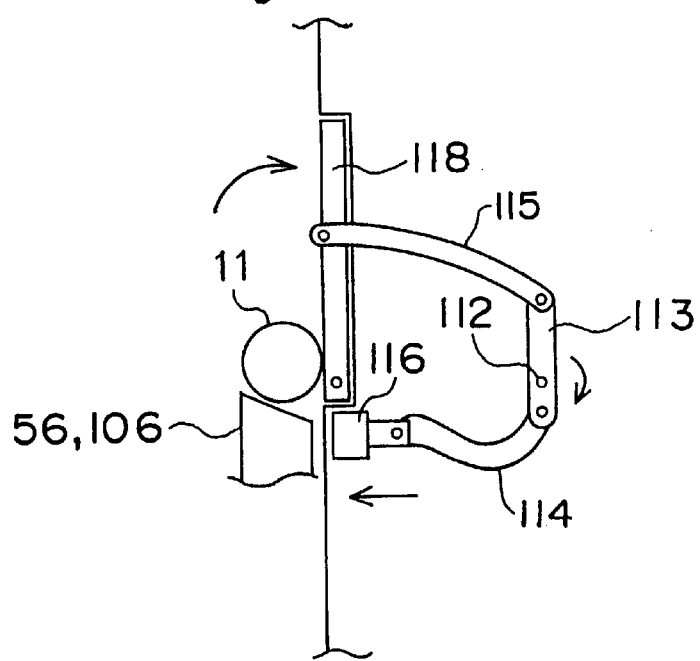

As shown in FIG. 27A, a first link 113 is so provided as to be pivotable about a pivot 112. One end of a second link 114 is pivotably connected to one end of the first link 113 and one end of a third link 115 is pivotably connected to the other end of the first link 113. A rod 116a of a cylinder 116 is pivotably connected to the other end of the second link 114 and other end of the third link 115 is pivotably connected to the middle portion of a tilting member 118 which is so provided as to be pivotable about a pivot 118a. When the cylinder 116 is actuated in this arrangement, the first link 113 pivots about the pivot 112 through the action of the rod 116a and of the second link 114, and thus the tilting member 118 pivots about the pivot 118a through the action of the third link 115.

In the aforementioned tablet packing apparatus, when an emergency stop button which is provided in both the lower middle portion of the storage shelves 1 and the middle potion of the tablet vessel feeding sections 3 is pressed down, or power supply is cut off due to power failure or the like during the operation, the apparatus is shut down. In this case, the controlling section 5 is possible to receive power supply from a secondary power source not shown, the operating condition is maintained. However, there may arise a case that an information on the tablet vessel 11 and the tablet which had been under conveyance can not be perfectly controlled. Thus, it is required to execute a restoring process in which the tablet vessel 11 and the tablet which had been under conveyance is recovered to reset the information.

In the restoring process which will be explained in detail hereinafter, the tablet vessel 11 and the tablet which had been under conveyance is recovered into the container chambers 6 of the storage shelves 1. Therefore, in the case that there is no room or few room for the container chambers 6, the tablet vessels 11 should be removed from the container chambers 6 so that the restoring process can be executed. Moreover, the conveying route of the tablet vessels 11, for example, the empty vessel conveyor 53, the cylinder 90, the holder disc 93 and so on should be visually inspected, and if the tablet vessels 11 are present there, then they should be removed. The removed tablet vessels 11 are returned to the original stock container 51.

It is preferable to make an indication on the touch panel 12 that the tablet is removed. Since an error that either the feeder vessels 36 or the stock vessel 51 is empty does not shows abnormality, the restoring process is not executed in such case.

Figure 28:
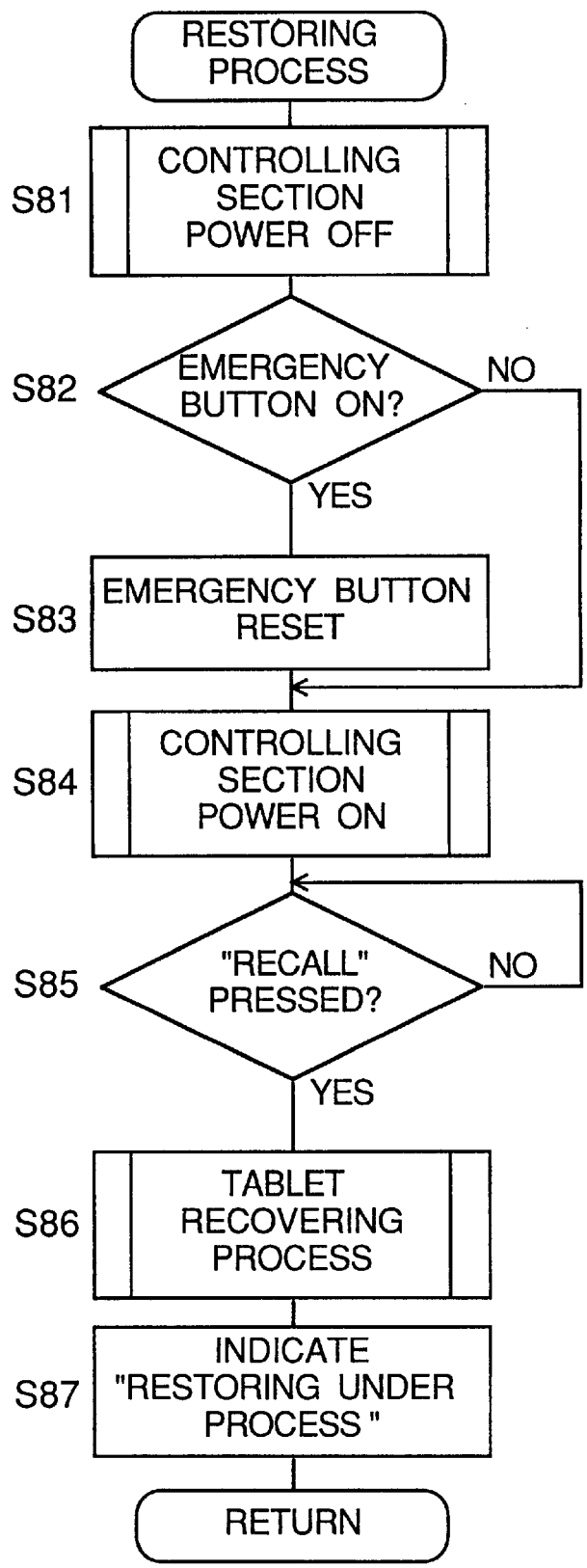
FIG. 28 is a flow chart illustrating a recovery process.

The restoring process will be explained in accordance with the flow chart as shown in FIG. 28.

Figure 30A:
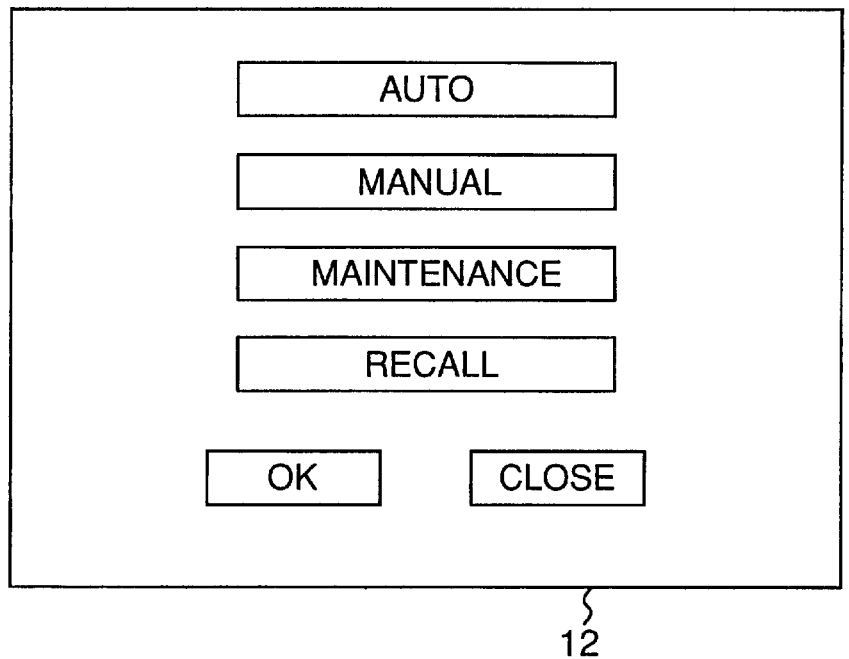
FIGS. 30A and 30B are views illustrating main menu displayed on a touch panel.
Figure 31A:
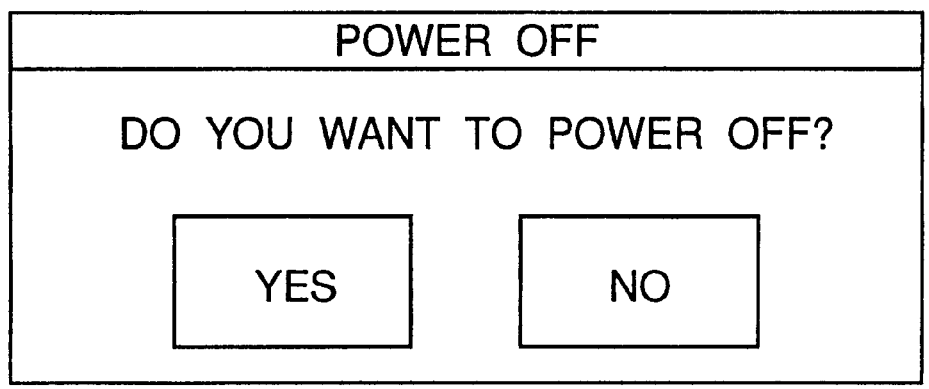
FIGS. 31A and 31B are front views illustrating contents displayed on the touch panel in the case of power-off.
Figure 31B:

The controlling section 5 is once powered off (step S81). This is because of the deletion of the processing data temporally stored in the memory of the controlling section 5. When an area displayed on the touch panel 12 by "CLOSE" as shown in FIG. 30A is touched, the indications of "DO YOU WANT TO POWER OFF?", "YES" and "NO" are displayed as shown in FIG. 31A. If the "YES" is selected, the indication that "IT'S SAFETY EVEN IF POWER IS POWERED OFF" is displayed to power off.

If the emergency stop button is pressed down (step S82), then the emergency stop button is reset (step S83) and the controlling section 5 is powered on again (step S84). Thus, the menu is displayed on the touch panel 12 as shown in FIG. 30A.

Figure 30B:
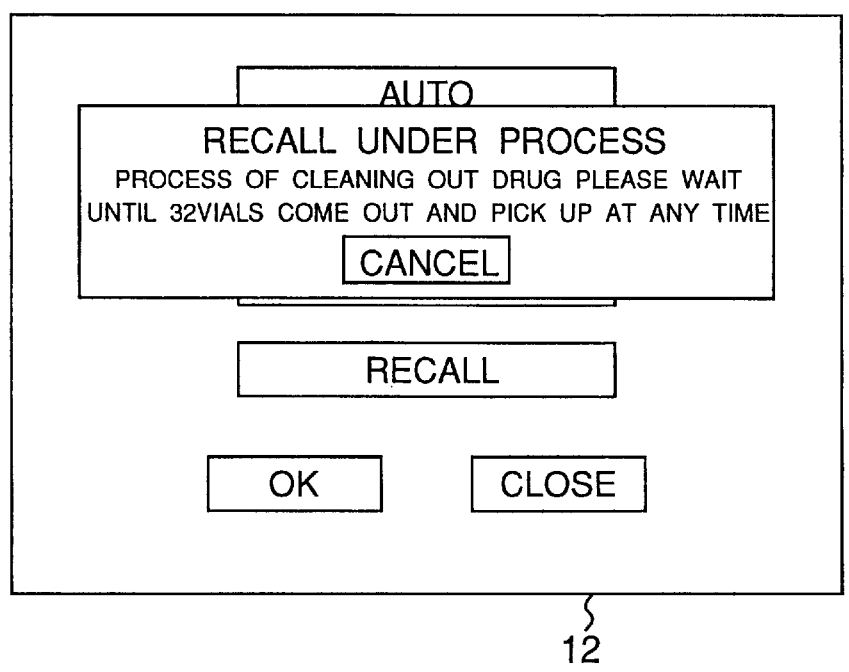

Among the items as shown in FIG. 30A, if the "RECALL" is touched (step S85), then the recovering process of the tablet which had been under conveyance is commenced (step S86). At this time, the indication that "RECALL UNDER PROCESS . . . " is displayed on the touch panel 12 as shown in FIG. 30B to indicate that restoring process is going on (step S87).

Figure 29:
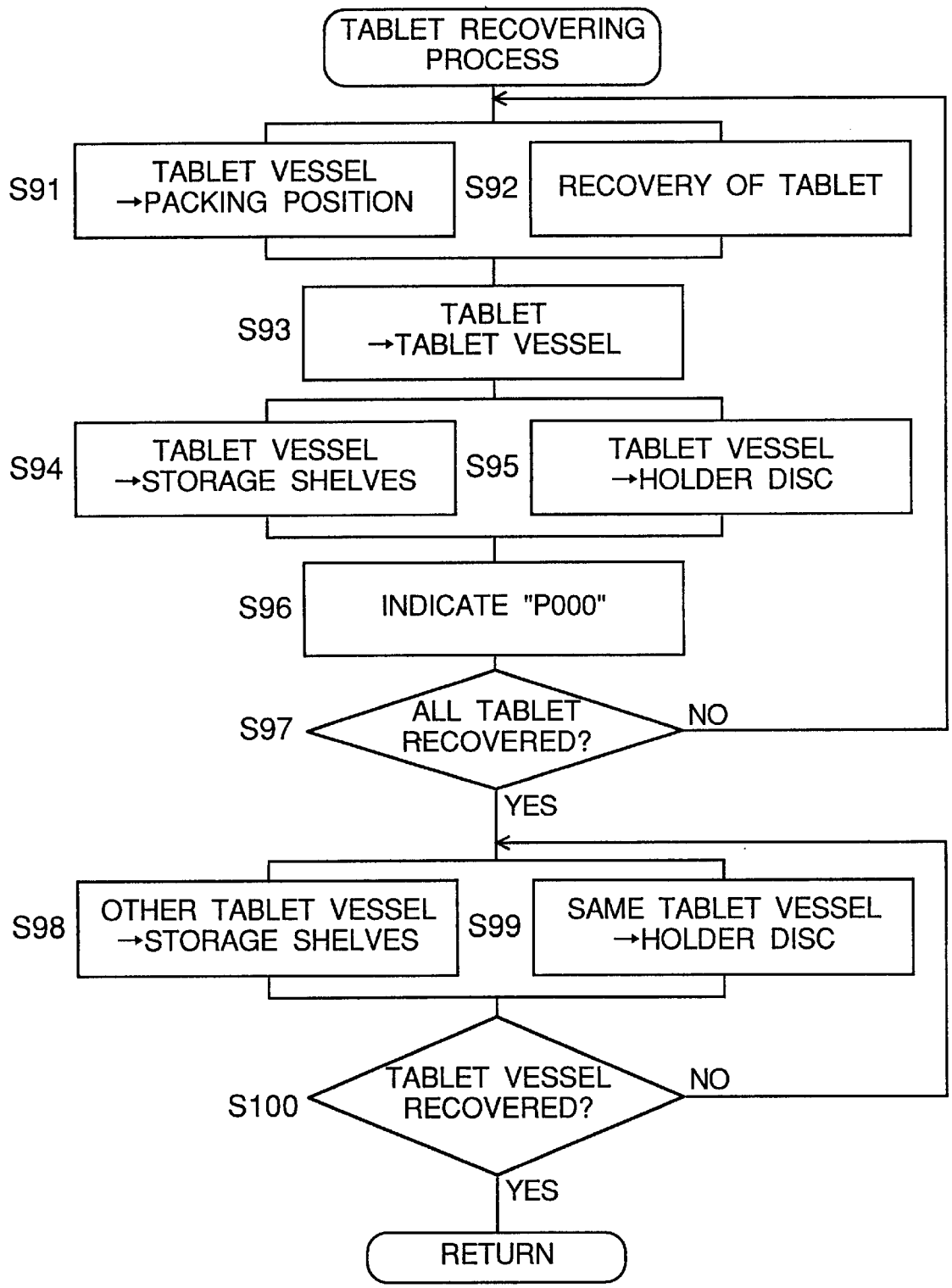
FIG. 29 is a flow chart illustrating the tablet recovering process in FIG. 28.

In the tablet recovering process, the tablets remaining in the conveyor vessels 46 and the hoppers 44 are recovered as shown in flow chart of FIG. 29. At first, the holder disc 93 is rotated to position the tablet vessel 11 having the largest capacity at the packing position, i.e., beneath the packing hopper 97 (step S91). Normally, since the tablet vessel 11 having the largest capacity is ready on the holder disc, such tablet vessel 11 is used. If such tablet vessel is not ready, it is replenished from the stock vessel 51. On the other hand, the tablets are recovered from any one of the common guide paths by means of the conveyor vessel 46 (step S92). Then, the tablets are packed into the largest tablet vessel 11 through the input hopper 94 and the packing hopper and so on (step S93). Consequently, the tablet vessel 11 packed with the tablets is transferred to the container chamber 6 of the storage shelves 1 by the arm member 15. At the same time, a tablet vessel 11 having the same size as the tablet vessel transferred to the storage shelves 1 is replenished to the holder disc 93 (step S95). In addition, the indication of "P000" is displayed on the display 7 (step S96) to enable an operator to distinguish at a glance that the recovered tablets are packed in the tablet vessel 11 transferred to the container chamber 6.

In the same manner as explained above, a tablet vessel 11 having the largest capacity is replenished to the holder disc 93 from the stock vessel 51 to recover the tablets remaining in the another common guide paths 31. Although there may be no tablet in the common guide paths 31, the recovery process of tablets should be executed from all of the common guide paths 31 in order to perfectly grasp which tablets had been under conveyance.

If the tablets remaining in all common paths 31 (step S97) is recovered, then other size of the tablet vessels 11 held on the holder disc 93 are recovered to the storage shelves 1 (step S98). In this case, the tablet vessels 11 having the same size as that of the tablet vessels 11 which are recovered and transferred to the container chamber 6 of the storage shelves 1 are replenished to the holder disc 93 from the corresponding stock vessel 51 (step S99).

If the recovery of the tablet vessels is finished (step S100), then main menu is displayed on the touch panel 12. The touch with "AUTO" enables the restoration to the normal operation, i.e., the tablet vessel feeding process (step S2), the tablet feeding process (step S3) and the tablet packing process (step S4) in the same manner as described before.

In the above explained restoring process, in the case that the tablet packing apparatus is stopped due to the abnormality, the controlling section 5 is always powered off to clear the processing data stored in the memory. However, it may be also possible to have the operator select whether such processing data is utilized or not. For example, when the indication of "RECALL" displayed on the touch panel 12, the processing data which are stored before the apparatus is stopped may be utilized to continue the process. In this case, the tablet vessels 11 remaining in the empty vessel conveyor 53, the cylinder 90, the holder disc 93 and so on, or the tablets remaining in the common guide paths 31 and the like are not necessary to be recovered.

Moreover, in the above explained restoring process, the indication of "P000" indicating recovery is displayed on the display 7 of the container chamber 6. Instead of this, it is also possible to indicate from which feeder vessel 36 the tablets were discharged from. In this case, it is necessary to memorize the common guide path from which the tablets were recovered based on the position of the conveyor vessel 46. Thus, according to both the memorized common guide path and the processing data, it is possible to specify the feeder vessel 36 from which the tablets were discharged.

Although the present invention has been fully described by way of the examples with reference to the accompanying drawing, it is to be noted that here that various changes and modifications will be apparent to those skilled in the art. Therefore, unless such changes and modifications otherwise depart from the spirit and scope of the present invention, they should be construed as being included therein.

What is claimed is:

1. A tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, the tablet feeding section comprising:

a plurality of feeder vessels for storing different types of tablets for each feeder vessel and discharging relevant tablets on the basis of prescription data;

tablet conveyor means for conveying the tablets, discharged from the feeder vessels, to the tablet packing section;

feeder shelves which accommodate one or more stacks of the feeder vessels; and one or more common guide paths which vertically extend in the feeder shelves and into which tablet discharging outlets of the feeder vessels open;

wherein a path shutter which can be closed and opened is provided at the lower end of the one or more common guide paths;

wherein at least two columns of the feeder shelves are disposed in parallel and a common hopper for receiving tablets discharged through the guide paths in the feeder shelves is provided;

wherein the tablet conveyor means comprises at least two conveyor paths which are disposed in parallel below the common hopper and conveyor vessels which are disposed on the conveyor paths so as to be capable of reciprocating; and wherein the common hopper comprises distributing means capable of feeding any one of the conveyor vessels with tablets.

2. A tablet packing apparatus as claimed in claim 1, wherein the common hopper comprises a hopper shutter which can be closed and opened to retain tablets temporarily.

3. A tablet packing apparatus as claimed in claim 2, wherein the hopper shutter can be closed and opened with a closing/opening switch.

4. A tablet packing apparatus having a tablet feeding section for feeding tablets, tablet vessel feeding sections for feeding tablet vessels, and a tablet packing section for packing tablets fed from the tablet feeding section, into a tablet vessel fed from the tablet vessel feeding sections, the tablet vessel feeding section comprising:

a stock container for storing a plurality of the tablet vessels;

vessel takeout means for taking out a tablet vessel from the stock container; and tablet vessel conveying means for conveying the tablet vessel taken out by the vessel takeout means;

wherein the vessel takeout means comprises:

vessel lifting members which are shaped like teeth of a comb so as to substantially horizontally project toward the inside of the stock container; and elevating means for elevating the vessel lifting members to takeout the tablet vessel.

5. A tablet packing apparatus as claimed in claim 4, wherein the vessel takeout means further comprises removing means for removing the tablet vessels held on the vessel lifting members except one tablet vessel and for returning the tablet vessels into the stock container.

6. A tablet apparatus having a tablet feeding section for feeding tablets, tablet vessel feeding sections for feeding tablet vessels, and a tablet packing section for packing tablets fed from the tablet feeding sections, into a tablet vessel fed from the tablet vessel feeding sections, the tablet packing section comprising:

orientation judging means for judging the orientation of the tablet vessel fed from the tablet vessel feeding sections;

orientation reversing means for reversing the orientation of the tablet vessel; and controlling means for actuating and controlling the orientation reversing means on the basis of a judgment given by the orientation judging means to cause the opening of the tablet vessel to face upward;

wherein the orientation reversing means comprises a cylinder of which a center part is rotatable supported so that when the cylinder rotates to a receiving position, a first opening of the cylinder is ready to receive the tablet vessel from the tablet vessel feeding sections and a second opening of the cylinder is shut with a shutter plate, and then the cylinder is rotated in a forward or a reverse direction to point the first opening or the second opening downward.

7. A tablet packing apparatus having a tablet feeding section for feeding tablets, tablet vessel feeding sections for feeding tablet vessels, and a tablet packing section for packing tablets, fed from the tablet feeding sections, into a tablet vessel fed from the tablet vessel feeding sections, the tablet packing section comprising:

a rotatable, disc-like, vessel holder section having on the outer circumference thereof a plurality of vessel receiving sections which are capable of holding the tablet vessels, so that any one of the vessel receiving sections can be positioned at a packing position, the vessel receiving sections being capable of holding tablet vessels of different sizes for each vessel receiving section;

size detecting means for detecting the sizes of the tablet vessels; and controlling means for actuating and controlling the vessel holder section on the basis of a detection signal given by the size detecting means to position, at a packing position, the vessel receiving section corresponding to a desired size of tablet vessel.

8. A tablet packing apparatus having a tablet feeding section for feeding tablets, tablet vessel feeding sections for feeding tablet vessels, and a tablet packing section for packing tablets fed from the tablet feeding sections, into a tablet vessel fed from the tablet vessel feeding sections, the tablet packing apparatus further comprising:

storage shelves having a plurality of container chambers for individually storing a tablet vessel packed with tablets and having display means for displaying relevant data out of prescription data upon the storage of a tablet vessel into one of the container chambers;

gripping means for gripping a tablet vessel packed with tablets;

packed vessel delivering means for delivering the tablet vessel from the packing position to a container chamber in the storage shelves with the travel of the gripping means;

vessel detecting means for detecting the presence or absence of a tablet vessel in each container chamber in the storage shelves; and controlling means for actuating and controlling the packed vessel delivering means on the basis of a detection signal provided by the vessel detecting means to deliver a tablet vessel to a vacant container chamber from which the tablet vessel could be taken out most easily.

9. A tablet packing apparatus having a tablet feeding section for feeding tablets, tablet vessel feeding sections for feeding tablet vessels, and a tablet packing section for packing tablets fed from the tablet feeding sections, into a tablet vessel fed from the tablet vessel feeding sections, the tablet packing apparatus further comprising:

storage shelves having a plurality of container chambers for individually storing a tablet vessel packed with tablets and having display means for displaying relevant data out of prescription data upon the storage of a tablet vessel into one of the container chambers;

gripping means for gripping a tablet vessel packed with tablets;

packed vessel delivering means for delivering the tablet vessel from the packing position to a container chamber in the storage shelves with the travel of the gripping means;

vessel detecting means for detecting the presence or absence of a tablet vessel in each container chamber in the storage shelves; and controlling means for actuating and controlling the packed vessel delivering means on the basis of a detection signal provided by the vessel detecting means to deliver a tablet vessel to a vacant container chamber to which the tablet vessel could be delivered in the shortest period of time.

10. A tablet packing apparatus in which a given number of tablets are packed into each tablet vessel of a type at a packing position, the tablet packing apparatus comprising:

stock containers for storing tablet vessels of which the sizes are different for each stock container;

vessel takeout means for taking out a tablet vessel from the stock containers;

tablet vessel feeding means for conveying the tablet vessel taken out by the vessel takeout means;

storage shelves having a plurality of container chambers for individually storing a tablet vessel packed with tablets;

packed vessel delivering means which has gripping means for gripping a tablet vessel and which delivers the tablet vessel from the tablet packing position to a container chamber in the storage shelves with the travel of the gripping means; and controlling means for causing the vessel takeout means and the tablet vessel feeding means to supply from a stock container a tablet vessel having the same size as the tablet vessel which has been just delivered to a container chamber in the storage shelves by the packed vessel delivering means.

11. A tablet packing apparatus in which a given number of tablets are packed into each tablet vessel of a type at a packing position, the tablet packing apparatus comprising:

stock containers for storing tablet vessels of which the sizes are different for each stock container;

vessel takeout means for taking out a tablet vessel from the stock containers;

tablet vessel feeding means for conveying the tablet vessel taken out by the vessel takeout means;

size detecting means for detecting the size of the tablet vessel delivered by the tablet vessel feeding means;

proper vessel judging means for judging whether the tablet vessel has a desired size or not by the comparison between a first size data of tablet vessel according to prescription data and a second size data of the tablet vessel detected by the size detecting means; and alarm means for alarming an operator in the case that the tablet vessel has been judged not to have the desired size on the basis of judgment signal from the proper vessel judging means.

12. A tablet packing apparatus as claimed in claim 11, further comprising eliminating means for eliminating the tablet vessel which has been judged not to have a desired size by the proper vessel judging means.

13. A tablet packing apparatus as claimed in claim 12, further comprising controlling means for actuating and controlling the vessel takeout means and the tablet vessel feeding means to feed a tablet vessel of a desired size from one of the stock containers in the case that the eliminating means has eliminated a tablet vessel.

14. A tablet packing apparatus having a tablet feeding section for feeding tablets, tablet vessel feeding sections for feeding tablet vessels, and a tablet packing section for packing tablets fed from the tablet feeding sections, into a tablet vessel fed from the tablet vessel feeding sections, wherein the tablet feeding section comprises a plurality of feeder vessels for storing different types of tablets, guide paths for holding tablets discharged from the tablet feeding section, and conveyor means for conveying the tablets held in the guide paths to the tablet packing section, and wherein the tablet packing apparatus further comprises:

storage shelves having a plurality of container chambers for individually storing a tablet vessel packed with tablets at the tablet packing section;

control means for executing a restoring process, wherein, after the apparatus is stopped due to an abnormality, the tablets remaining in the guide paths and the conveyor means are conveyed to the tablet packing section by the conveyor means to recover them into the tablet vessel and then the tablet vessel is transferred to the container chamber of the storage shelves; and a display section for indicating that the tablet vessel, in which recovered tablets are packed, is transferred to the container chamber of the storage shelves.

15. A tablet packing apparatus as claimed in claim 14, wherein the display section distinctly indicates which feeder vessel is the feeder vessel from which the recovered tablets were discharged.

16. A tablet packing apparatus as claimed in claim 14, wherein it is selectable whether the remaining tablet packing process is resumed based on previous processing data without executing the restoring process, or whether the previous processing data is cleared to execute the restoring process.

* * * * *